(12) United States Patent
Rash et al.

(10) Patent No.: US 9,703,562 B2
(45) Date of Patent: Jul. 11, 2017

(54) INSTRUCTION EMULATION PROCESSORS, METHODS, AND SYSTEMS

(71) Applicant: Intel Corporation, Santa Clara, CA (US)

(72) Inventors: William C. Rash, Saratoga, CA (US); Bret L. Toll, Hillsboro, OR (US); Scott D. Hahn, Portland, OR (US); Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 13/844,881

(22) Filed: Mar. 16, 2013

(65) Prior Publication Data
US 2014/0281399 A1    Sep. 18, 2014

(51) Int. Cl.
G06F 9/30   (2006.01)
G06F 9/40   (2006.01)

(52) U.S. Cl.
CPC ........ G06F 9/30145 (2013.01); G06F 9/3017 (2013.01); G06F 9/30189 (2013.01)

(58) Field of Classification Search
None
See application file for complete search history.

(56) References Cited

U.S. PATENT DOCUMENTS

| 5,781,750 A | 7/1998 | Blomgren et al. |
| 6,289,300 B1 * | 9/2001 | Brannick ............. G06F 9/3005 703/23 |
| 6,356,997 B1 | 3/2002 | Krishnan et al. |
| 6,745,322 B1 * | 6/2004 | Brockmann ........ G06F 9/30174 712/239 |
| 6,799,157 B1 * | 9/2004 | Kudo .................. G06F 17/5022 703/23 |

(Continued)

FOREIGN PATENT DOCUMENTS

| CN | 1965558 A | 5/2007 |
| CN | 102110011 A | 6/2011 |

(Continued)

OTHER PUBLICATIONS

Office Action received for Japanese Patent Application No. 2014-051191, mailed on Feb. 24, 2015, 3 pages of English Translation and 1 page of Japanese Office Action.

(Continued)

*Primary Examiner* — Michael Sun
(74) *Attorney, Agent, or Firm* — Vecchia Patent Agent, LLC

(57) ABSTRACT

A processor of an aspect includes decode logic to receive a first instruction and to determine that the first instruction is to be emulated. The processor also includes emulation mode aware post-decode instruction processor logic coupled with the decode logic. The emulation mode aware post-decode instruction processor logic is to process one or more control signals decoded from an instruction. The instruction is one of a set of one or more instructions used to emulate the first instruction. The one or more control signals are to be processed differently by the emulation mode aware post-decode instruction processor logic when in an emulation mode than when not in the emulation mode. Other apparatus are also disclosed as well as methods and systems.

15 Claims, 17 Drawing Sheets

(56) References Cited

U.S. PATENT DOCUMENTS

| | | |
|---|---|---|
| 6,820,190 B1 | 11/2004 | Knebel et al. |
| 2009/0172713 A1 | 7/2009 | Kim et al. |
| 2010/0257338 A1 | 10/2010 | Spracklen et al. |
| 2010/0299663 A1 | 11/2010 | Weissman et al. |
| 2011/0153307 A1* | 6/2011 | Winkel .................. G06F 9/455 703/26 |
| 2012/0296626 A1 | 11/2012 | Bond et al. |
| 2013/0246768 A1 | 9/2013 | Gschwind |
| 2014/0281398 A1 | 9/2014 | Rash et al. |

FOREIGN PATENT DOCUMENTS

| | | |
|---|---|---|
| EP | 0 709 767 A1 | 5/1996 |
| EP | 0 730 226 A2 | 9/1996 |
| EP | 1 197 847 A2 | 4/2002 |
| EP | 1 197 847 A3 | 5/2003 |
| JP | 03-177931 A | 8/1991 |
| JP | H04-199331 A | 7/1992 |
| JP | 11-510288 A | 9/1999 |
| JP | 2000-322269 A | 11/2000 |
| JP | 2001-306334 A | 11/2001 |
| JP | 2004-110809 A | 4/2004 |
| JP | 2004-280795 A | 10/2004 |
| JP | 2005-501330 A | 1/2005 |
| JP | 2006-178646 A | 7/2006 |
| JP | 2011-134318 A | 7/2011 |
| JP | 05-081034 B2 | 11/2012 |
| JP | 2012-527707 A | 11/2012 |
| KR | 10-2003-0040515 A | 5/2003 |
| KR | 10-2006-0071344 A | 6/2006 |
| WO | 97/13195 A1 | 4/1997 |
| WO | 98/59292 A1 | 12/1998 |
| WO | 02/29507 A2 | 4/2002 |
| WO | 2003/019353 A1 | 3/2003 |

OTHER PUBLICATIONS

Combined Search and Examination report received for United Kingdom Patent Application No. 1404410.1, mailed on Oct. 1, 2014, 6 pages.
Office Action received for Korean Patent Application No. 10-2014-0031294, mailed on May 29, 2015, 4 pages of English Translation and 5 pages of Korean Office Action.
Office Action received for Korean Patent Application No. 10-2014-0031017, mailed on Aug. 21, 2015, 5 pages of Korean Office Action and 5 pages of English Translation.
Non-Final Office Action received for U.S. Appl. No. 13/844,873, mailed on Oct. 20, 2015, 18 pages.
Combined Search and Examination Report received for United Kingdom Patent Application No. 1404224.6, mailed on Sep. 4, 2014, 9 pages.
Examination Report received for United Kingdom Patent Application No. 1404224.6, mailed on Nov. 2, 2015, 4 pages.
Office Action received for Japanese Patent Application No. 2014-045403, mailed on Feb. 24, 2015, 3 pages of English Translation and 1 page of Japanese Office Action.
Office Action received for Japanese Patent Application No. 2014-045403, mailed on Jan. 5, 2016, 2 pages of English Translation and 2 pages of Japanese Office Action.
Intel Corporation, "Intel Architecture Software Developer's Manual", vol. 2 Instruction Set Reference, CQ Publishing Co. 1997, 4 pages.
Senda, Daisuke, "OS-font Windows Vista & Office 2007", Kanji literature information processing research, No. 7, Yoshifumi Publishing Co., Ltd., pp. 126-138, Oct. 1, 2006. Section entitled Problems in the Intel base, 1 page.
Office Action received for United Kingdom Patent Application No. 1404410.1, mailed on Sep. 17, 2015, 2 pages.
Office Action received for Korean Patent Application No. 10-2014-0031294, mailed on Apr. 29, 2016, 5 pages of Office Action including 2 pages of English Translation.
Notice of Allowance received for Japan Patent Application No. 2014-051191, mailed on Jul. 5, 2016, 1 page of Notice of Allowance.
Office Action received for Korean Patent Application No. 10-2014-0031017, mailed on Jun. 30, 2016, 11 pages of Korean Office Action including 5 pages of English Translation.
Final Office Action received for U.S. Appl. No. 13/844,873, mailed on Jul. 22, 2016, 22 pages.
Notice of Allowance received for Japanese Patent Application No. 2014-045403, mailed on Aug. 9, 2016, 2 pages of Japanese Notice of Allowance.
Office Action received for Chinese Patent Application No. 201410098131.8, mailed on May 17, 2016, 28 pages of ahinese Office Action including 12 pages of English Translation.
Office Action received for Chinese Patent Application No. 201410098580.2, mailed on Sep. 30, 2016, 21 pages of Chinese Office Action including 8 pages of English Translation.
Examination Report received for United Kingdom Patent Application No. 1404224.6, mailed on Nov. 16, 2016, 3 pages.

* cited by examiner

METHOD PERFORMED
BY OPERATING SYSTEM
880

DETERMINE THAT FIRST INSTRUCTION HAVING GIVEN OPCODE IS TO HAVE SECOND MEANING INSTEAD OF FIRST MEANING WHEN EXECUTED BY PROCESSOR FROM SOFTWARE PROGRAM — 881

STORE INDICATION THAT FIRST INSTRUCTION HAVING GIVEN OPCODE IS TO HAVE SECOND MEANING IN STATE OF PROCESSOR — 882

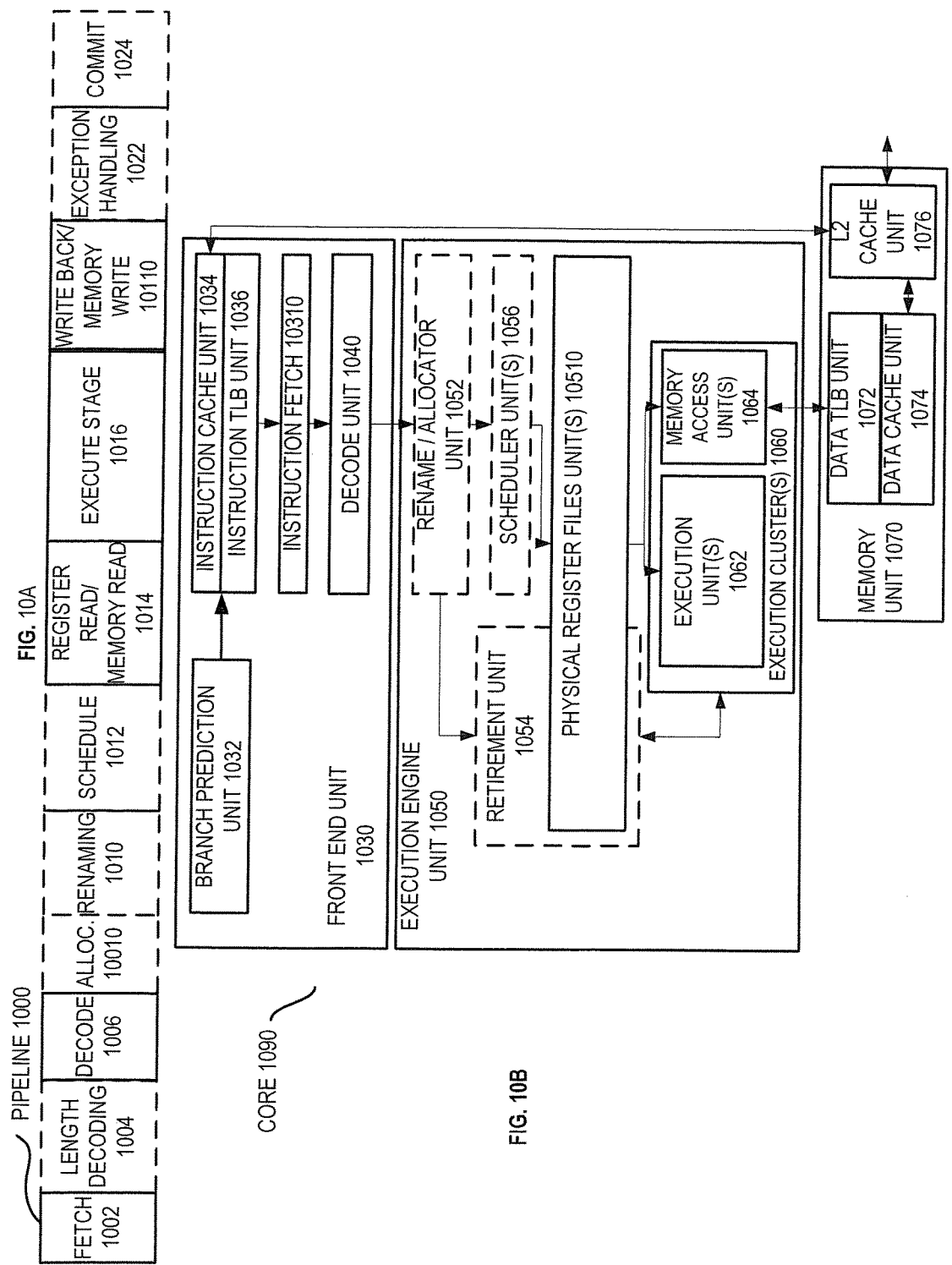

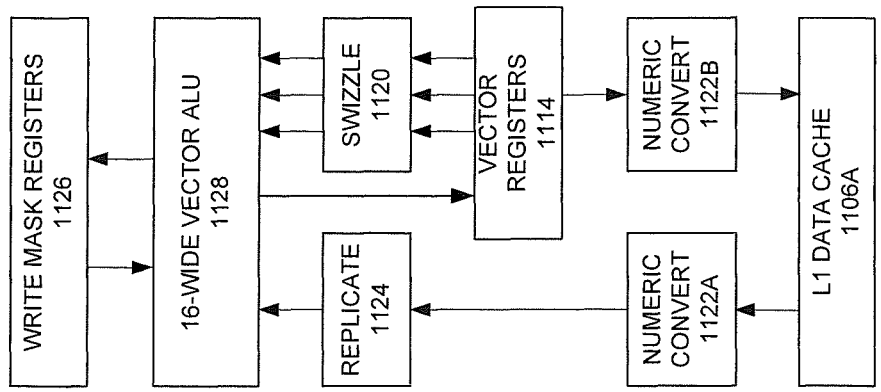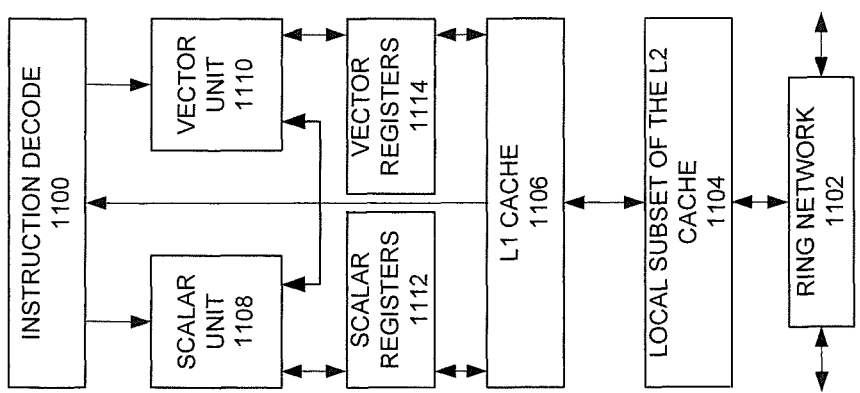

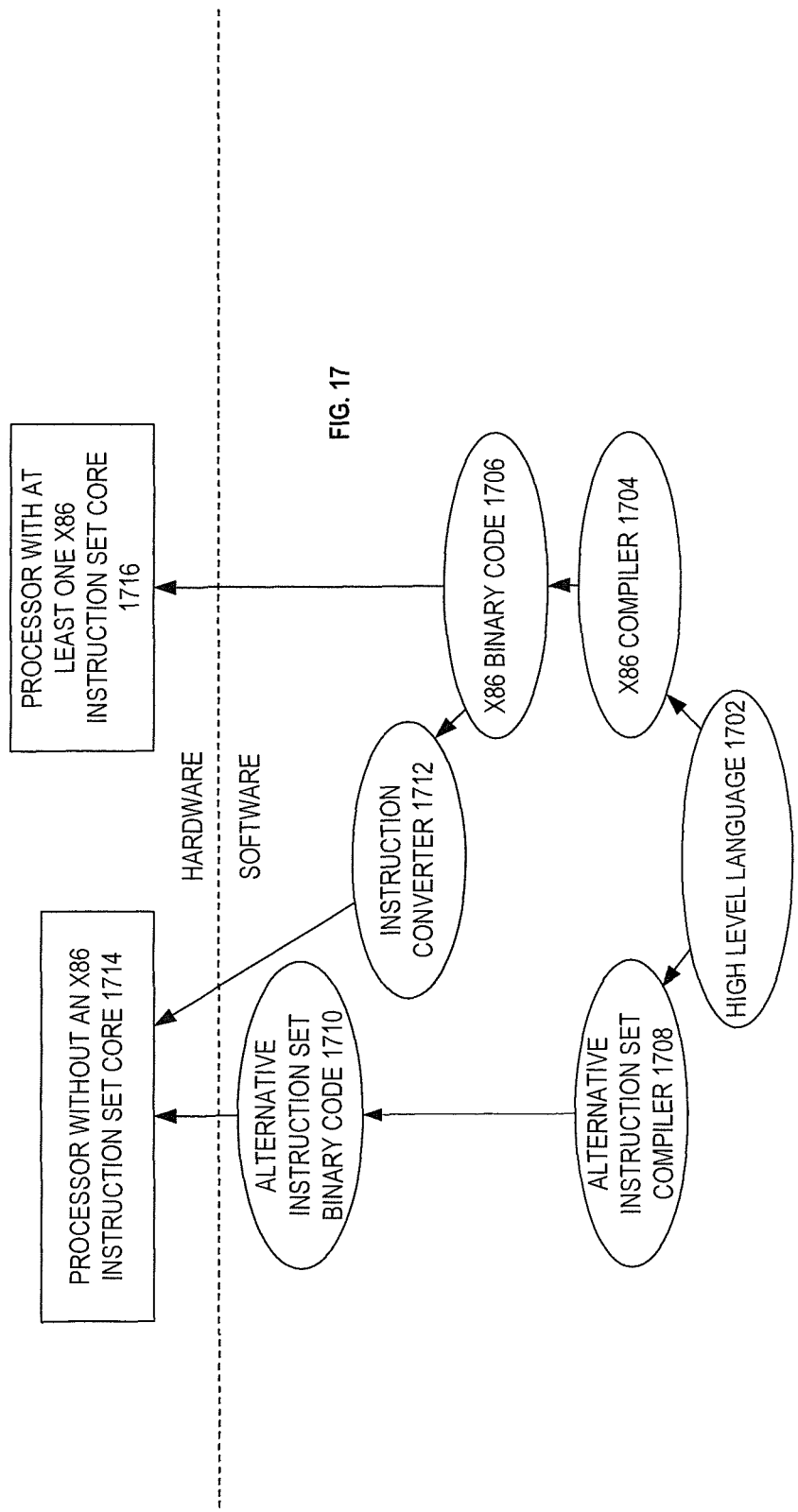

INSTRUCTION EMULATION PROCESSORS, METHODS, AND SYSTEMS

BACKGROUND

Technical Field

Embodiments described herein generally relate to processors. In particular, embodiments described herein generally relate to instruction emulation in processors.

Background Information

Processors typically have instruction set architectures (ISA). The ISA generally represents the part of the architecture of the processor that is related to programming. The ISA commonly includes the native instructions, architectural registers, data types, addressing modes, and the like, of the processors. One part of the ISA is the instruction set. The instruction set generally includes macroinstructions or ISA level instructions that are provided to the processor for execution. Execution logic and other pipeline logic is included to process the instructions of the instruction set. Often, the amount of such execution and other pipeline logic may be considerable. Commonly, the more instructions in the instruction set, and the more complex and/or specialized the instructions in the instruction set, the greater the amount of such logic is. Such hardware may tend to increase the manufacturing cost, the size, and/or the power consumption of the processors.

BRIEF DESCRIPTION OF THE DRAWINGS

The invention may best be understood by referring to the following description and accompanying drawings that are used to illustrate embodiments of the invention. In the drawings:

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIG. 11A is a block diagram of a single processor core, along with its connection to the on-die interconnect network and with its local subset of the Level 2 (L2) cache, according to embodiments of the invention.

FIG. 11B is an expanded view of part of the processor core in FIG. 11A according to embodiments of the invention.

FIG. 17 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are instruction emulation processors, methods, and systems. In the following description, numerous specific details are set forth (e.g., specific emulation mode aware logic, approaches for handling exceptional conditions, types of privileged resources and information, logic implementations, microarchitectural details, sequences of operations, logic partitioning/integration details, hardware/software partitioning details, processor configurations, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
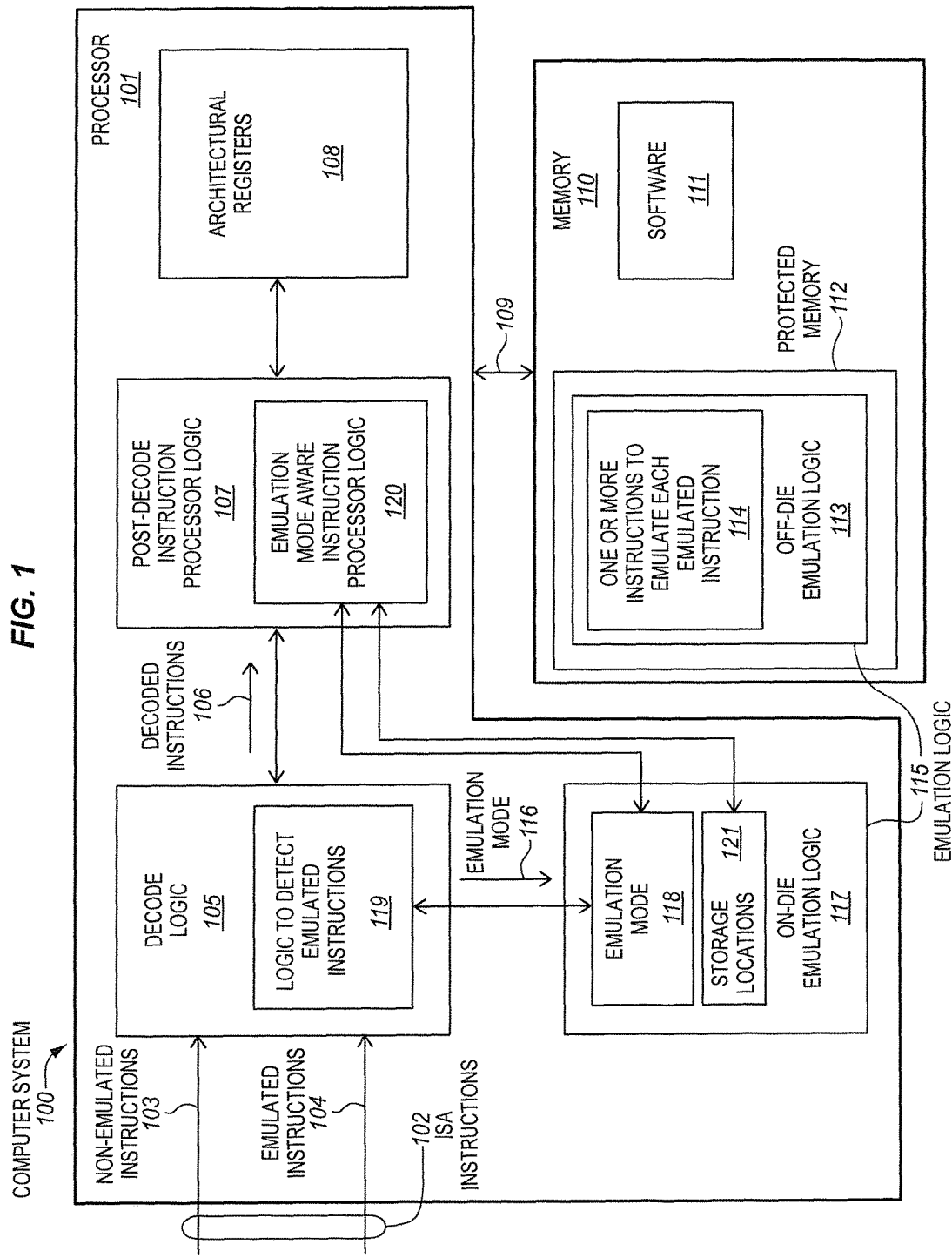
FIG. 1 is a block diagram of an embodiment of a computer system.

FIG. 1 is a block diagram of an embodiment of a computer system 100. In various embodiments, the computer system may represent a desktop computer, laptop computer, notebook computer, tablet computer, netbook, smartphone, personal digital assistant, cellular phone, server, network device (e.g., router or switch), Mobile Internet device (MID), media player, smart television, set-top box, video game controller, or other type of electronic device.

The computer system includes an embodiment of a processor 101. In some embodiments, the processor may be a general-purpose processor. For example, the processor may be a general-purpose processor of the type commonly used as a central processing unit (CPU). In other embodiments, the processor may be a special-purpose processor. Examples of suitable special-purpose processors include, but are not limited to, co-processors, graphics processors, communications processors, network processors, cryptographic processors, embedded processors, and digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors entirely.

The computer system also includes an embodiment of a memory 110 that is coupled with the processor 101 by a coupling mechanism 109. Any conventional coupling mechanism known in the arts for coupling a processor and a memory is suitable. Examples of such mechanisms include, but are not limited to, interconnects, busses, hubs, memory controllers, chipsets, chipset components, and the like, and combinations thereof. The memory may include one or more memory devices of either the same or different types. One commonly used type of memory that is suitable for embodiments is dynamic random access memory (DRAM), although other types of memory (e.g., flash memory) may alternatively be used.

The memory 110 may have software 111 stored therein. The software may include, for example, one or more operating systems (OS) and one or more applications. During operation, a portion of the software may be loaded onto the processor and run on the processor. As shown, the processor may receive ISA instructions 102 of an instruction set of the processor. For example, an instruction fetch unit may fetch the ISA instructions. The ISA instructions may represent macroinstructions, assembly language instructions, machine-level instructions, or other instructions provided to the processor to be decoded and executed. As shown, in some embodiments, the ISA instructions may include both non-emulated instructions 103 and one or more types of emulated instructions 104.

The processor includes decode logic 105. The decode logic may also be referred to as a decode unit or decoder. The decode logic may receive the ISA instructions 102. In the case of the non-emulated instructions 103, the decode logic may decode the relatively higher-level instructions and output one or more relatively lower-level microinstructions, micro-operations, micro-code entry points, or other relatively lower-level instructions or control signals derived from the ISA instructions. In the illustration, these are shown as decoded instructions 106. The decoded instructions output from the decoder may reflect, represent, and/or be derived from the higher-level ISA instructions input to the decoder and may implement the ISA instructions through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

A post-decode instruction processor logic 107 is coupled with the decode logic. The post-decode instruction processor logic may represent a post-decode portion of the instruction processing pipeline of the processor. The post-decode instruction processor logic may receive and process the decoded instructions 106. Commonly, the post-decode instruction processor logic may include register read and/or memory read logic, execution logic, register and/or memory write back logic, and exception handler logic, although the logic may vary from one architecture to another, and the scope of the invention is not limited to such logic. In some embodiments, for example in the case of an out-of-order processor pipeline, the post-decode instruction processor logic may optionally include other logic, such as, for example, allocation logic, renaming logic, scheduling logic, retire or commit logic, or the like.

The processor also includes one or more sets of architecturally-visible or architectural registers 108. The architecturally-visible registers represent registers that are visible to the software and/or a programmer and/or the registers that are specified by the ISA instructions 102 to identify operands. These architectural registers are contrasted to other non-architectural or non-architecturally visible registers in a given microarchitecture (e.g., temporary registers used by instructions, reorder buffers, retirement registers, etc.). The architectural registers generally represent on-die processor storage locations that are operable to store data. These architectural registers are often referred to herein simply as registers. By way of example, the architectural registers may include a set of general-purpose registers, a set of packed data registers, a set of floating point registers, a set of integer registers, or some combination thereof. The architectural registers may be implemented in different ways in different microarchitectures using well-known techniques and are not limited to any particular type of circuit. Examples of suitable types of architectural registers include, but are not limited to, dedicated physical registers, dynamically allocated physical registers using register renaming, and combinations thereof.

The post-decode instruction processor logic 107 is coupled with the registers 108. The post-decode instruction processor logic may receive data from, and write or store data to, the registers. For example, the register read logic may read data from registers indicated as source operands of instructions and/or the write back logic may write or store results to registers indicated as destination operands of the instructions. The post-decode instruction processor logic is also coupled with the memory 110 and may receive data from, and store data to, the memory. For example, the memory read logic may read data from memory locations indicted by instructions and/or the memory write back logic may write data to memory locations indicated by instructions.

Referring again to FIG. 1, the emulated instructions 104 may also be provided to the decode logic 105. In contrast to the non-emulated instructions 103, the emulated instructions 104 may not be fully decoded by the decode logic and provided as corresponding decoded instructions 106 to the post-decode instruction processor logic 107. Rather, in some embodiments, emulation logic 115 may be provided to emulate the emulated instruction(s) 104. In the arts, various different terms are given to such emulation, such as, for example, instruction translation, binary translation, code morphing, instruction interpretation, and the like. The term emulation is used broadly herein to encompass these various different terms used in the industry.

As shown, in some embodiments, the emulation logic 115 may be split between partly on-die emulation logic 117 and partly off-die emulation logic 113, although this is not required. In other embodiments, all of the emulation logic 115 may optionally be on-die or a majority may optionally be off-die, although typically there will be at least some on-die emulation logic (e.g., an emulation mode 118, some emulation mode aware instruction processor logic 120 in the pipeline, etc.). The on-die emulation logic is fixed, resident, or persistent on-die with the processor. Commonly, the on-die emulation logic is present on-die with the processor even when the processor is powered off, prior to booting, and/or at the time of completion of manufacture. Examples of suitable on-die emulation logic includes, but is not limited to, hardware (e.g., integrated circuitry, transistors, etc.), firmware (e.g., on-die ROM, EPROM, flash memory, or other persistent or non-volatile memory and non-volatile instructions stored therein), or a combination thereof.

The off-die emulation logic 113 may be included in the memory 110. The off-die emulation logic may be coupled with, or otherwise in communication with, the on-die emulation logic. In some embodiments, the off-die emulation logic may be included in a protected region or portion 112 of the memory. In some embodiments, the protected portion may be reserved for use by on-die hardware and/or firmware logic of the processor alone but not for the software 111 executing on the processor. For example, in some embodiments, the on-die emulation logic 117, the emulation mode aware instruction processor logic 120, and/or potentially other on-die processor logic, may be able to access and use the off-die emulation logic 113, but the software 111 (e.g., an operating system or application) running on the processor may not be able to access or use the off-die emulation logic 113. In some embodiments, the off-die emulation logic may be protected from access and modification by and/or be invisible to applications, the operating system, a virtual machine manager if there is one, and/or I/O devices. This may help to promote security.

The decode logic includes logic 119 to detect or recognize the emulated instruction 104. For example, the decoder may detect the emulated instruction based on an opcode. In some embodiments, upon detecting the emulated instruction, the decoder may provide an emulation mode signal 116 (e.g., an emulation trap signal) to emulation logic 115. As shown, the emulation logic may have an emulation mode 118. By way of example, the emulation mode may include one or more bits or controls in a control or configuration register of the processor to indicate whether or not the processor (e.g., the logic 105, 107, etc.) is in the emulation mode. In some embodiments, the emulation mode 118 may be entered when upon receipt of the emulation mode signal 116 from the decoder indicating that an emulated instruction 104 is to be emulated.

In some embodiments, the decode logic 105 may also provide other information associated with the instruction being emulated to the emulation logic 115. Examples of such information includes potentially, but is not limited to, operand identifiers (e.g., source or destination register addresses or memory locations), memory addressing modes, immediates, constants to speed execution, and/or other information from and/or associate with the emulated instruction 104. By way of example, any information from the emulated instruction and/or associated with the emulated instruction that is useful to the emulation system to allow the emulation system to emulate the emulated instruction 104 may potentially be provided.

In some embodiments, the emulation logic 115 may include a different set of one or more instructions 114 to emulate each different type of emulated instruction 104. For example, a first set of one or more instructions 114 may be provided to emulate a first instruction 104 having a first opcode, and a second, different set of one or more instructions 114 may be provided to emulate a second, different instruction 104 having a second, different opcode. In some embodiments, each set may include at least three instructions. In the illustrated embodiment, the set of one or more instructions 114 are included in the off-die emulation logic 113, although this is not required. In other embodiments, the instructions 114 may be provided on-die (e.g., in a persistent or non-volatile memory of the on-die emulation logic 117). In still other embodiments, part of the instructions 114 may be provided on-die (e.g., in the on-die emulation logic) and part may be provided off-die (e.g., in the off-die emulation logic).

In some embodiments, each of the instructions of the set of one or more instructions 114 used to emulate the emulated instruction 104 may be fetched or otherwise retrieved from the emulation logic 115 and provided to the decode logic 105. In some embodiments, each of the instructions of the set of one or more instructions 114 used to emulate the emulated instruction 104 may be of a same instruction set as the emulated instruction 104. The decode logic 105 may be operable to decode each of the set of one or more instructions 114 into corresponding decoded instructions 106. The decoded instructions may be provided to the post-decode instruction processor logic 107.

The post-decode instruction processor logic includes an embodiment of emulation mode aware instruction processor logic 120. As shown, the emulation mode aware instruction processor logic may be coupled with, or otherwise aware of, the emulation mode 118. In some embodiments, the emulation mode aware instruction processor logic may be operable to process at least some of the decoded versions of the instructions 114 differently in at least some ways when the processor is in the emulation mode than when the processor is not in the emulation mode. There are various different ways in which the processing may be different. In some embodiments, fault or error handling may be performed differently when in the emulation mode as compared to when not in the emulation mode. In other embodiments, access to certain types of resources and/or information, such as, for example, secure, privileged, or otherwise access controlled resources and/or information, may be handled differently when in the emulation mode than when not in the emulation mode. For example, access to the resources and/or information may be allowed when in the emulation mode but not allowed when not in the emulation mode.

When in the emulation mode, the post-decode instruction processor logic may access storage locations 121. In the illustrated embodiment, the storage locations 121 are part of the on-die emulation logic 117. Alternatively, the storage locations may be included in the off-die emulation logic, or partly in the on-die emulation logic and partly in the off-die emulation logic. The storage locations may be used to store temporary variables, intermediate results, and/or execution state associated with the execution of the set of instructions 114. This may help to avoid needing to save the execution state of the original program having the emulated instruction 104 and/or may help to prevent such execution state (e.g., the contents of the architectural registers 108) from being corrupted by the processing of the set of instructions 114. In some embodiments, the storage locations 121 may emulate architectural registers, although this is not required. In some embodiments, the contents of the storage locations 121 may be independent of, isolated from, and/or protected from access by applications, operating systems, virtual machine managers, I/O devices, interrupts, and the like. Upon completion of the set of instructions 114, the architectural state of the processor may be updated (e.g., a result may be stored from the storage locations 121 to the registers 108). This may be done with low latency access. Commonly, this may be used to approximate, imitate, resemble, or otherwise emulate the change in architectural state that would have occurred and/or the behavior of the processor that would have happened if the emulated instruction 104 had actually been executed directly.

To avoid obscuring the description, a relatively simple processor 101 has been shown and described. In other embodiments, the processor may optionally include other well-known components. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC) and/or a chip multi-processor (CMP).

Some processors use relatively complex operations. For example, instead of only a single memory access, some instructions perform multiple memory accesses. An example is a vector gather instruction to gather a vector of data elements from memory. As another example, instead of comparing a single pair of data elements, or pairs of corresponding data elements in two packed data, certain instructions may perform many data element comparisons. Examples are vector conflict instructions and string processing instructions. One approach is to fully implement such complex operations in hardware. However, often the amount of hardware needed may tend to be considerable, which may tend to increase manufacturing cost, die size, and power consumption. Another approach is to implement such complex operations at least partly in microcode. The use of microcode may help reduce the amount of hardware need to implement such complex operations and/or may help to allow certain existing hardware to be reused. However, some processors do not use microcode (e.g., do not use microcode to implement any instructions of an instruction set).

In some embodiments, a relatively more complex instruction and may be emulated with the set of one or more relatively simpler instructions. The terms more complex and simpler are relative terms, not absolute terms, which are relative to each other. Advantageously, this may potentially help to reduce the amount of hardware needed to implement the more complex instruction and/or may help to allow reuse of existing hardware that is used by the one or more instructions used to emulate the more complex instruction. In some embodiments, the emulation of the more complex instruction with the one or more instructions simpler may be used to provide a microcode-like implementation of the more complex instruction even though the processor, in some embodiments, may not be configured to use microcode and/or may not be configured to use microcode to implement the more complex instruction.

Figure 2:
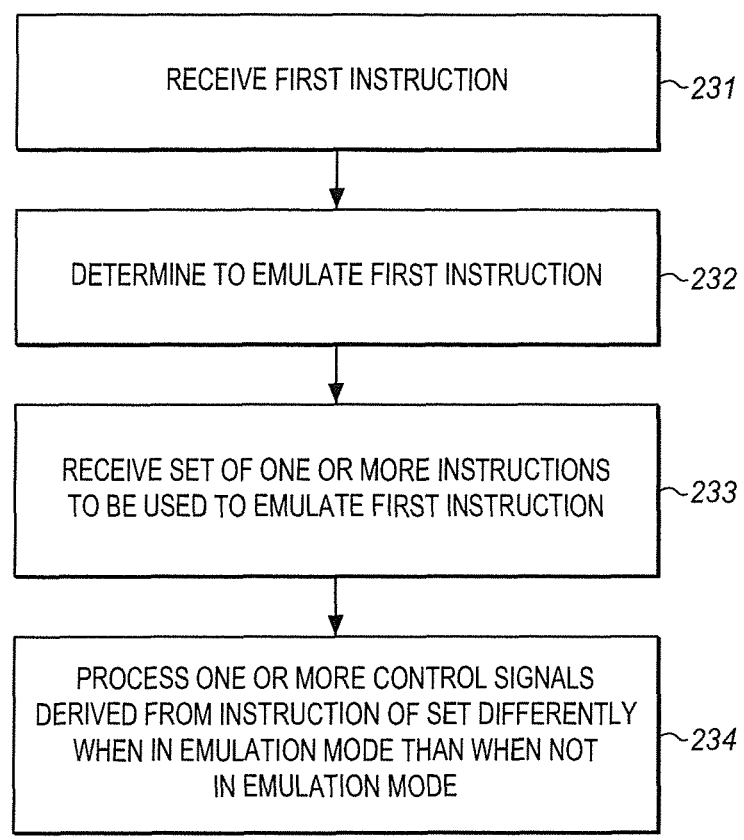
FIG. 2 is a block flow diagram of an embodiment of a method of emulating an instruction in a processor.

FIG. 2 is a block flow diagram of an embodiment of a method 230 of emulating an instruction in a processor. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or entirely different processor. Moreover, the processor of FIG. 1 may perform operations and/or methods similar to or different than those of FIG. 2.

The method includes receiving a first instruction, at block 231. In some embodiments, the first instruction may be received at a decoder. The method includes determining to emulate the first instruction, at block 232. In some embodiments, the decoder may determine to emulate the first instruction by determining that an opcode of the first instruction is among a set of one or more opcodes for instructions to be emulated. The method includes receiving a set of one or more instructions to be used to emulate the first instruction, at block 233. In some embodiments, the set of instruction(s) may be received at the decoder from on-die emulation logic, or off-die emulation logic, or a combination thereof. In some embodiments, each of the instruction(s) of the set may be of a same instruction set as the first instruction. The method includes processing one or more control signals derived from an instruction of the set differently when in an emulation mode than when not in the emulation mode, at block 234.

This may be done in different ways in different embodiments. In some embodiments, exceptional conditions encountered during processing of an instruction of the set may be handled differently. In some embodiments, the processing of an instruction of the set may allow access to information and/or resources that would not otherwise be available to the same instruction (i.e., an instruction having the same opcode) when not done within an emulation mode.

Figure 3:
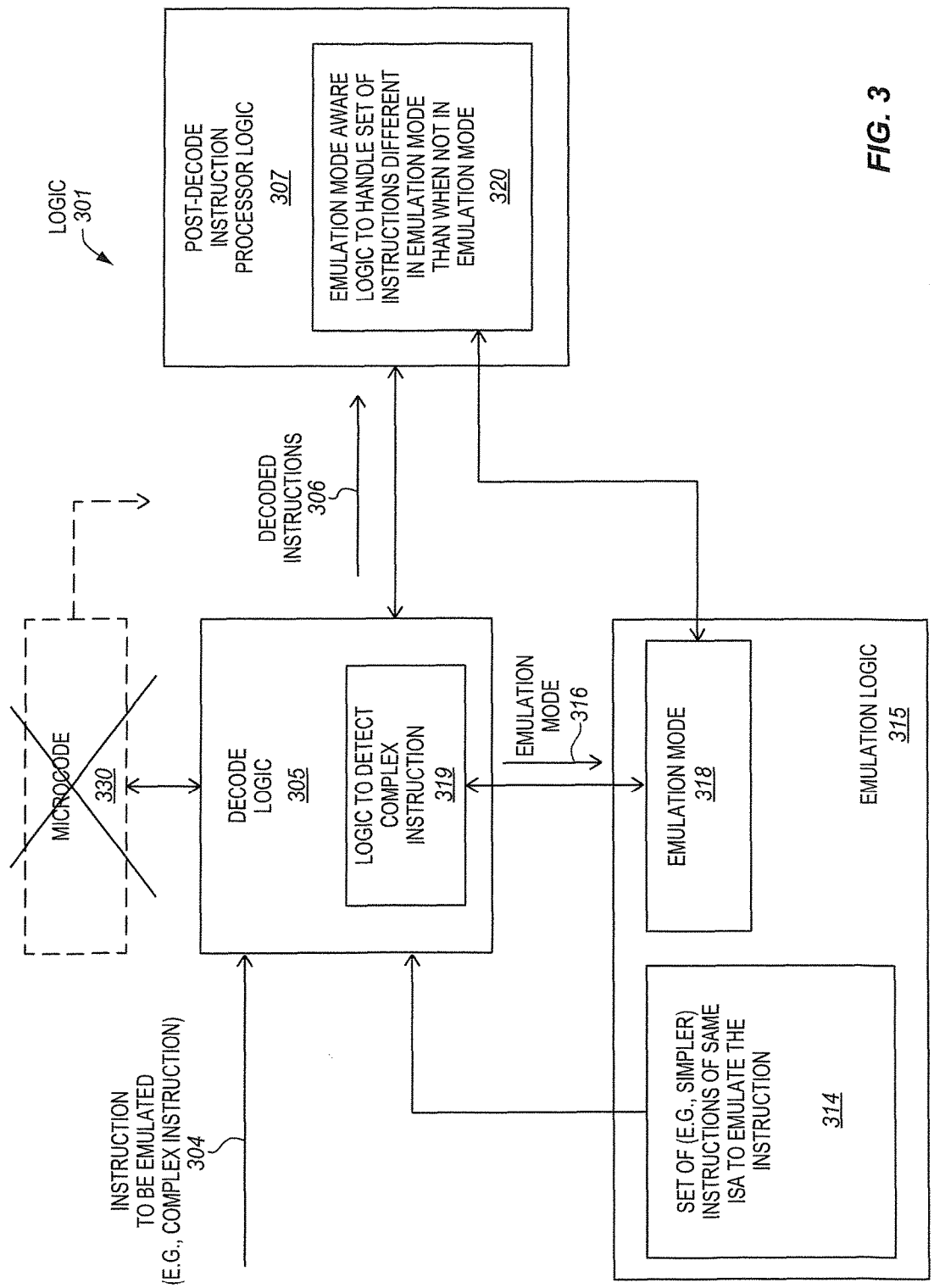
FIG. 3 is a block diagram illustrating an embodiment of logic to emulate an instruction with a set of one or more instructions.

FIG. 3 is a block diagram illustrating an embodiment of logic 301 to emulate an instruction (e.g., a complex instruction) 304 with a set of one or more instructions (e.g., simpler instructions) 314. In some embodiments, the logic of FIG. 3 may be included in the processor and/or the computer system of FIG. 1. Alternatively, the logic of FIG. 3 may be included in a similar or different processor or computer system. Moreover, the processor and/or the computer system of FIG. 1 may include similar or different logic than that of FIG. 3.

An instruction (e.g., a complex instruction) 304 that is to be emulated may be provided to decode logic 305. The decode logic may include logic 319 to detect the instruction 304, for example, to detect that an opcode of the instruction 304 is among a set of opcodes of instructions that are to be emulated. As shown, in some embodiments, the processor may not have microcode 330. The decode logic may provide an emulation mode signal 316 to emulation logic 315. In various embodiments, the emulation logic 315 may include on-die logic, off-die logic, or both on-die and off-die logic. The emulation logic may enter an emulation mode 318 in response to the emulation mode signal.

The emulation logic also includes a set of one or more simpler (e.g., simpler) instructions 314 that may be used to emulate the (e.g., more complex) instruction 304. In some embodiments, the one or more instructions 314 may be of a same instruction set as the instruction 304. In some embodiments, the one or more instructions 314 may be identical to other instructions decoded and executed when not in the emulation mode. To emulate the (e.g., complex) instruction 304, each of the one or more (e.g., simpler) instructions 314 may be provided to the decode logic. The decode logic may decode each of the instructions 314 as one or more decoded instructions 306.

A post-decode instruction processor logic 307 may receive the decoded instructions 306 corresponding to the instructions 314. The post-decode instruction processor logic may include an embodiment of emulation mode aware logic 320. As shown, in some embodiments, the emulation mode aware logic may be coupled with, or otherwise aware of, the emulation mode 318. In some embodiments, the emulation mode aware logic may be operable to process the decoded instructions 306 corresponding to the instructions 314 differently when the processor is in the emulation mode 318, than when the processor is not in the emulation mode. In some embodiments, fault or error handling may be performed differently when in the emulation mode as compared to when not in the emulation mode. For example, the logic 320 may use optional aspects discussed below for FIG. 4. In other embodiments, access to certain resources and/or information may be selectively provided when in the emulation mode, but not when the processor is not in the emulation mode. For example, the logic 320 may use optional aspects discussed below for FIG. 5.

Advantageously, in some embodiments, a more complex instruction may be implemented by a set of simpler instructions/operations. Advantageously, this may potentially help to reduce the amount of hardware needed to implement the more complex instruction and/or may help to allow reuse of existing hardware that is used by the one or more instructions used to emulate the more complex instruction. In some embodiments, the emulation of the more complex instruction with the one or more instructions simpler may be used to provide a microcode-like implementation of the more complex instruction even though the processor, in some embodiments, may not be configured to use microcode and/or may not be configured to use microcode to implement the more complex instruction. In some embodiments, the simpler instructions/operations may even be of the same instruction set as the more complex instruction.

Such emulation of more complex instructions with simpler instructions is just one example of a possible reason to emulate an instruction. In other embodiments, the emulated instruction may be one that is relatively less frequently used (e.g., infrequently used) and may be emulated with one or more instructions that are relatively more frequently used. Advantageously, this may potentially help to reduce the amount of hardware needed to implement the infrequently used instruction and/or may help to allow reuse of existing hardware that is used by the one or more instructions used to emulate the infrequently used instruction. In still other embodiments, the emulated instruction may be an older and/or outdated instruction and/or may be one that is in the process of being deprecated, and may be emulated with the one or more other instructions. Advantageously, the emulation may help to allow the instruction that is being deprecated to still be executed and thereby provide backward compatibility to software, while at the same time potentially helping to reduce the amount of hardware needed to implement the deprecated instruction and/or helping to allow reuse of existing hardware that is used by the one or more instructions used to emulate the deprecated instruction. Still other uses of the emulation disclosed herein will be apparent to those skilled in the art and having the benefit of the present disclosure.

Figure 4:
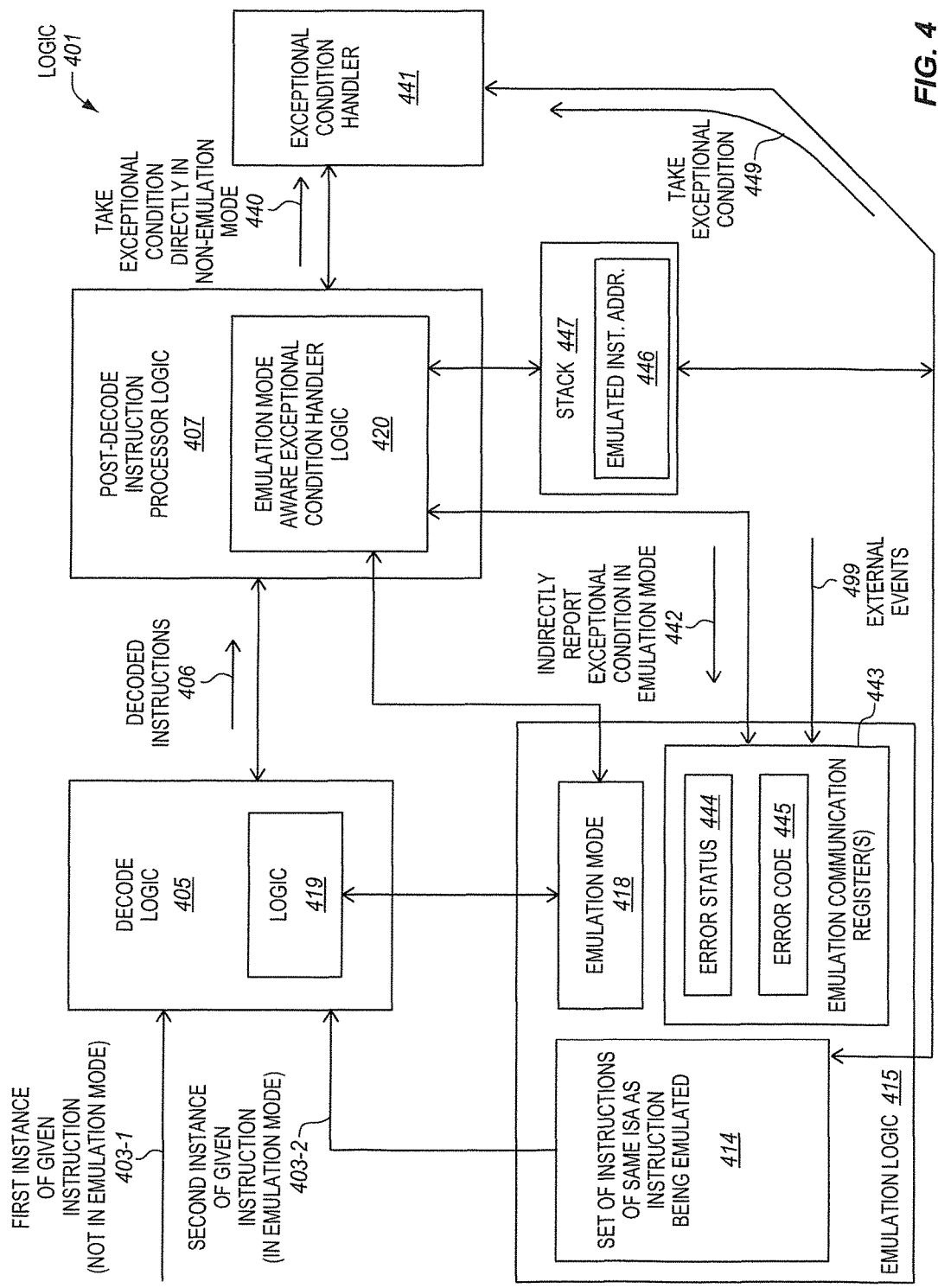
FIG. 4 is a block diagram illustrating an embodiment of logic to allow a processor to handle exceptional conditions differently when in an emulation mode as compared to when not in the emulation mode.

FIG. 4 is a block diagram illustrating an embodiment of logic 401 to allow a processor to handle exceptional conditions differently when in an emulation mode as compared to when not in the emulation mode. In some embodiments, the logic of FIG. 4 may be included in the processor and/or the computer system of FIG. 1 and/or the logic of FIG. 3. Alternatively, the logic of FIG. 4 may be included in a similar or different processor or computer system. Moreover, the processor and/or the computer system of FIG. 1 and/or the logic of FIG. 3 may include similar or different logic than that of FIG. 4.

A first instance 403-1 of a given instruction (e.g., an instruction having a given opcode) is provided to decode logic 405 when the processor is not in an emulation mode 418. A second instance 403-2 of the same given instruction (e.g., another instruction having the same given opcode) is provided to the decode logic when the processor is operating in the emulation mode 418. The second instance 403-2 of the given instruction may be provided from a set of one or more instructions 414 used to emulate an emulated instruction, in response to a decoder receiving the emulated instruction. The set of instructions may be included in emulation logic 415 that may be on-die, off-die, or partly on-die and partly off-die. The emulation logic 515 may have any of the optional characteristics mentioned elsewhere herein for the emulation logic. The decode logic may provide (e.g., an identical set) of one or more decoded instructions for each of the first 403-1 and second instances 403-2 of the given instruction.

Post-decode instruction processing logic 407 may receive the decoded instruction(s) 406. The post-decode instruction processing logic includes emulation mode aware exceptional condition handler logic 420. The emulation mode aware exceptional condition handler logic is operable to handle/process exceptional conditions in an emulation mode aware way. As used herein, the term "exceptional condition" refers broadly to various different types of exceptional conditions that may occur while processing instructions. Examples of such exceptional conditions include, but are not limited to, exceptions, interrupts, faults, traps, and the like. The terms exception, interrupt, fault, and trap are often used in different ways in the arts. The term "exception" is perhaps more commonly used to refer to an automatically generated control transfer to a handler routine in response to privilege violations, privilege exceptions, page faults, memory protection faults, division by zero, attempted execution of an illegal opcode, and other such exceptional conditions.

In some embodiments, if a privilege violation, page fault, memory protection fault, division by zero, attempted execution of an illegal opcode, or other exceptional condition occurs when the first instance 403-1 of the given instruction is being processed, when the processor is not operating in the emulation mode 418, then the processor may perform substantially conventional handling of the exceptional condition. For example, in some embodiments, the exceptional condition may be taken directly 440 in which control is transferred to an exceptional condition handler routine 441. Commonly, the exceptional condition handler routine may be part of an operating system, a virtual machine monitor, or other privileged software. Examples of such handler routes include, but are not limited to page fault handlers, error handlers, interrupt handlers, and the like.

In contrast, in some embodiments, if a privilege violation, page fault, memory protection fault, division by zero, attempted execution of an illegal opcode, or other exceptional condition occurs when the second instance 403-2 of the given instruction is being processed, when the processor is operating in the emulation mode 418, then the processor may perform substantially non-conventional handling of the exceptional condition. For example, in some embodiments, the exceptional condition may not be taken directly. In some embodiments, the logic 420 may include a mechanism to suppress an otherwise automatic control transfer to an exceptional condition handler routine that would otherwise result from the exceptional condition. Control may not be transferred directly from the emulation program to the exceptional condition handler routine 441. Rather, in some embodiments, the emulation mode aware exceptional condition handler logic 420 may temporarily suppress control transfer to the exceptional condition handler 441 and indirectly report 442 the exceptional condition. In some embodiments, the emulation mode aware exceptional condition handler logic 420 may indirectly report the exceptional condition through one or more emulation communication register(s) 443. The one or more communication registers may be used to communicate information between the emulation logic and the program having the original instruction being emulated.

In some embodiments, in response to the exceptional condition occurring when in the emulation mode 418, the emulation mode aware exceptional condition handler logic 420 may store an indication of the exceptional condition in an exceptional condition or error status flag(s), field, or register 444. For example, a single bit or flag may have a first value (e.g., be set to binary one) to indicate that an exceptional condition has occurred, or may have a second value (e.g., be cleared to binary zero) to indicate that no exceptional condition occurred. In some embodiments, in response to the exceptional condition occurring when in the emulation mode 418, the emulation mode aware exceptional condition handler logic 420 may store an error code for the exceptional condition in an error code field or register 445. The error code may provide additional information about the error, such as, for example, a type of the error and optionally additional details to help communicate the nature of the exceptional condition. Alternatively, instead of using the communication registers, the information may be otherwise signaled or provided (e.g., stored in memory, reported through an electrical signal, etc.).

In some embodiments, the emulation mode aware exceptional condition handler logic 420 may also provide an indication of the address (e.g., the instruction pointer) of the instruction being emulated (i.e., the one that caused the second instance 403-2 to be sent to the decode logic 405). For example, in some embodiments, the address 446 of the instruction being emulated may be stored on the top of a stack 447. Storing the address of a given instruction that is being emulated on the stack, instead of one of the instructions that are being used to emulate that given instruction, may cause the return from the exception handler to return to the emulated instruction, instead of to one of the instructions that are being used to emulate that emulated instruction. If instead, the return from the exception handler were to one of the instructions that are being used to emulate that instruction, this may potentially cause a problem. For example, software (e.g., an application, operating system, etc.) may not know of the instructions that are being used to emulate that given instruction and may not recognize the associated address. The operating system may perceive that control flow is being transferred to an unknown, illegal, risky, or not allowed location, and may potentially attempt to prevent the transfer.

In some embodiments, the set of instructions 414 may monitor the error status 444 and/or the error code 445. For example, in some embodiments, the instructions 414 may read the error status 444 and the error code 445 from the emulation communication registers 443 to learn of the exceptional condition and about the exceptional condition. When the error status 444 indicates an exceptional condition, in some embodiments, the set of instructions 414 may take the exceptional condition 449. For example, one or more of the instructions 414 may be executed to check the error status and transfer control to the exceptional condition handler if an error is indicated. In some embodiments, this may include the set of instructions 414 transferring control to the exceptional condition handler 441. In some embodiments, information about the exceptional condition (e.g., the error code 445) may be provided to the exceptional condition handler 441. In some embodiments, the emulated instruction address 446 may also be provided to the exceptional condition handler 441 and/or may be at least preserved on the top of the stack. The emulated instruction address 446 may be used by the exceptional condition handler 441 upon return from handling the exceptional condition. Advantageously, by storing the address of the instruction being emulated on the stack, the operating system or other error handler routine may think it is the instruction that is emulated that caused the error.

In some embodiments, the emulation logic may include logic to test and report whether memory access in the instruction will work correctly, or the type of exceptional condition that may result. For example, a special instruction may be included to test a memory address with emulated access rights to see if the memory address is valid (e.g., if the page is present) and whether the program has sufficient access rights to read and/or modify that memory location. If any tests fail, the emulation logic may pass control to the proper interrupt handler with a return address as if the instruction being emulated had directly passed control to the exception handler. As another example, a state machine may perform a conditional memory transaction which indicates whether the memory operation would be valid. This may be used to determine when a memory operation may be performed assuming no exception will result. This may also be used to determine how many bytes of an instruction stream or a string of instruction information may be safely read without exceptions. For example, this may be used to test and determine whether or not an instruction length may be read or if part of the instruction length would cause a page fault. The emulation logic may include logic to deal with instructions that span multiple pages and/or when a page is not in memory.

In some embodiments, the emulation logic may include logic to provide an intermediate execution interrupt status such that execution of the emulation may stop and later resume at the intermediate point. This may be advantageous especially when emulating instructions that involve long durations or execution times. In some embodiments, the set of instructions used to emulate certain types of instructions (e.g., move string instructions, gather instructions, and others with long operations) may update the execution state of the software having the instruction being emulated to reflect a current level of progress. For example, the operation may be interrupted at an intermediate point and the set of instructions used for emulation may set a flag or status bit in the saved machine state by the exceptional condition handler (e.g., in a processor status register) such that on return the emulation code may be able to test the flag or status bit to determine it is resuming execution from an intermediate state. The flag or status bit may indicate interrupted execution. This way, when returning from an exceptional condition handler, after an exceptional condition has been handled, the program may resume execution at an intermediate level of progress where it left off. In some cases, an instruction (e.g., a move string instruction) may modify registers to reflect an intermediate state of the operation so that after an interrupt execution may be resumed from the intermediate state.

Figure 5:
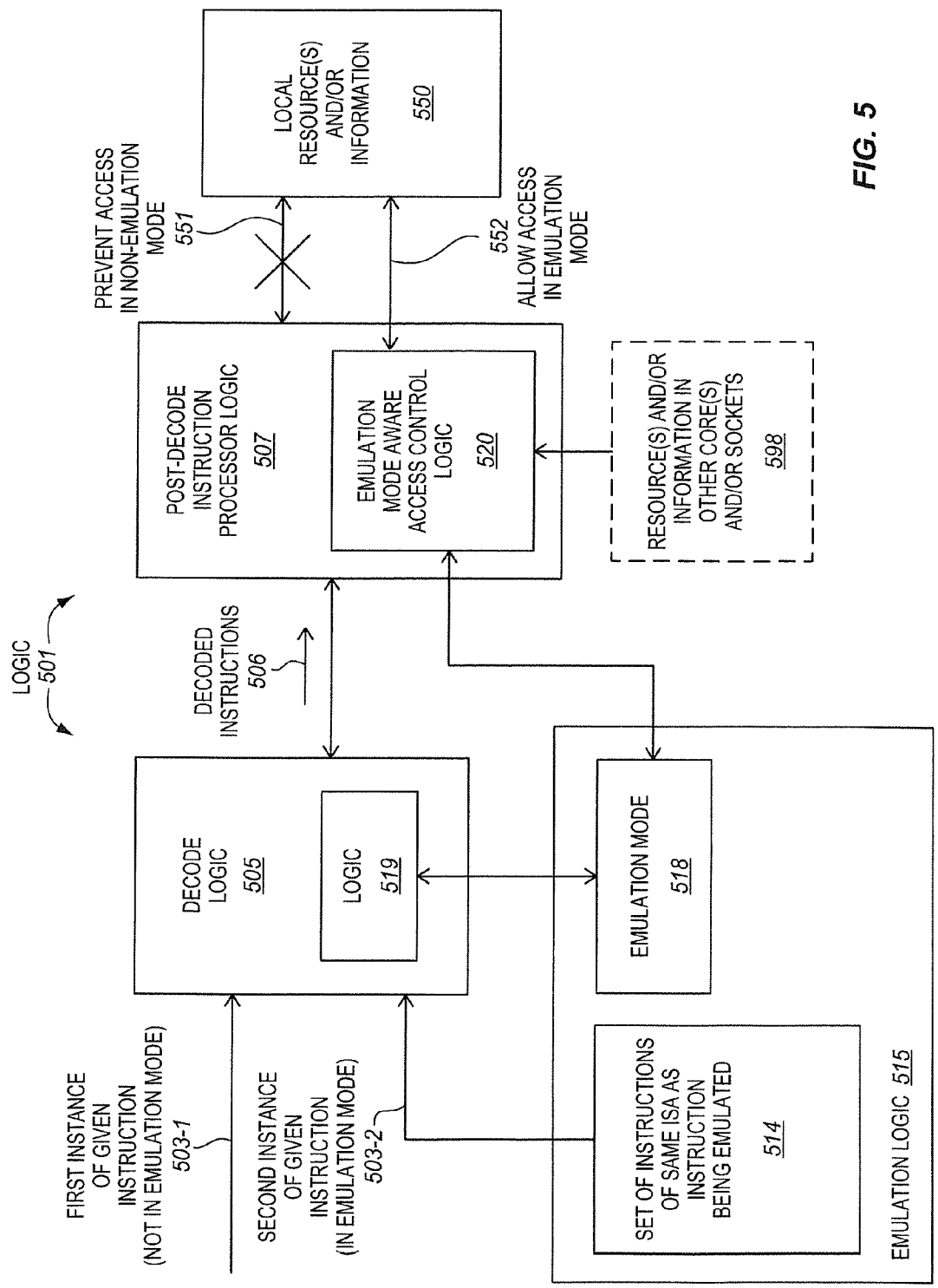
FIG. 5 is a block diagram illustrating an embodiment of logic to allow a processor to access resource(s) and/or information differently when in an emulation mode than when not in the emulation mode.

FIG. 5 is a block diagram illustrating an embodiment of logic 501 to allow a processor to access resource(s) and/or information differently when in an emulation mode than when not in the emulation mode. In some embodiments, the logic of FIG. 5 may be included in the processor and/or the computer system of FIG. 1 and/or the logic of FIG. 3. Alternatively, the logic of FIG. 5 may be included in a similar or different processor or computer system. Moreover, the processor and/or the computer system of FIG. 1 and/or the logic of FIG. 3 may include similar or different logic than that of FIG. 5.

A first instance 503-1 of a given instruction (e.g., an instruction having a given opcode) is provided to decode logic 505 when the processor is not in an emulation mode 518. A second instance 503-2 of the same given instruction (e.g., another instruction having the same given opcode) is provided to the decode logic when the processor is operating in the emulation mode 518. The second instance 503-2 of the given instruction may be provided from a set of one or more instructions 514 used to emulate an emulated instruction, in response to a decoder receiving the emulated instruction. The set of instructions may be included in emulation logic 515 that may be on-die, off-die, or partly on-die and partly off-die. The emulation logic 515 may have any of the optional characteristics mentioned elsewhere herein for the emulation logic.

Post-decode instruction processor logic 507 may receive the decoded instruction(s) 506 corresponding to the second instance 503-2. The post-decode instruction processor logic includes emulation mode aware access control logic 520. The emulation mode aware access control logic is operable to control access to one or more resources and/or information 550 in a way that is emulation mode aware. In some embodiments, when the processor is not operating in the emulation mode, the post-decode instruction processor logic 507 may process the first instance 503-1 of the given instruction with substantially conventional access to the resource(s) and/or information 550. As shown, in some embodiments, access to the resource(s) and/or information 550 may be prevented 551 when processing the first instance 503-1 of the given instruction when not in the emulation mode. Preventing access to the resource(s) and/or information when not in emulation mode may be appropriate for any of various possible reasons, such as, for example, to protect the security of information and/or resource(s), because the given instruction generally does not need to access those resource(s) and/or information and you want to provide the resource(s) and/or information only on an as needed basis, or for other reasons.

In contrast, in some embodiments, when the second instance 503-2 of the given instruction is being processed, when operating in the emulation mode 518, the post-decode instruction processor logic may use substantially non-conventional access to the resource(s) and/or information 550 (e.g., in a way that is different than when in non-emulation mode). For example, as shown in the illustrated embodiment, access to the resource(s) and/or information 550 may be allowed 552 when processing the second instance 503-2 of the given instruction when in the emulation mode 518. By way of example, the emulation mode 518 may allow the logic 507 and/or the logic 520 to have a special hardware state that allows selective access the information and/or resource(s) for that given instruction when in emulation mode. For example, one or more access privilege bits may be provided and configured when in the emulation mode to allow a state machine to selectively access the information.

Various different types of information and/or resource(s) 550 are contemplated. Examples of suitable resource(s) and/or information include, but is not limited to, security related resource(s) and/or information (e.g., security logic), encryption and/or decryption related resource(s) and/or information (e.g., encryption logic and/or decryption logic), a random number generator resource(s) and/or information (e.g., random number generator logic), resource(s) and/or information reserved for privilege or ring levels corresponding to an operating system and/or virtual machine monitor, and the like.

Another example of suitable resource(s) and/or information include, but is not limited to, resource(s) and/or information in a different physical processor or logical processor (e.g., a core, hardware thread, thread context, etc.) than the physical processor or logical processor having the post-decode instruction processor logic 507. The different physical or logical processors may be in either the same or different sockets. By way of example, when in an emulation mode, an emulation mode aware control logic 520 may be able to access information and/or resource(s) of another core in another socket (e.g., query a status of the core) that would not be available to the post-decode instruction processor logic 507 when not in the emulation mode.

Advantageously, the emulation mode aware access control logic 520 may help to allow at least some of the instructions 514 to selectively have access to certain resource(s) and/or information when in the emulation mode that would not ordinarily be available to the same instructions of the instruction set when not in the emulation mode. Security may still be maintained, since the emulation logic may be on-die and/or in a protected portion of memory.

In some embodiments, some execution levels, for example security execution states, may be prohibited from using such emulation to access these resource(s) and/or information. For example, not all execution states may be allowed to use emulated opcodes. Special security execution states may not be certifiably secure if such interrupts or lower level execution is allowed. Instead, if such execution levels or security execution states need similar access, they may instead implement it by using hardware primitives available to emulation software.

In some embodiments, instruction emulation may be used to help provide different meanings for a given opcode of an instruction. Macroinstructions, machine language instructions, and other instructions of an instruction set, often include an operation code or opcode. The opcode generally represents a portion of the instruction that is used to specify the particular instruction and/or the operation to be performed in response to the instruction. For example, an opcode of a packed multiply instruction may be different than an opcode of a packed add instruction. Generally, the opcode includes several bits in one or more fields that are logically if not physically grouped together. Often, it is desirable to try to keep the opcodes relatively short, or as short as possible while allowing the desired number of instructions/operations. Relatively long opcodes tend to increase the size and/or complexity of the decoder and also generally tend to make the instructions longer. For a fixed number of bits in an opcode, generally only a fixed number of different instructions/operations may be identified. There are various tricks known in the art to try to get the most out of the opcode, for example, by using escape codes, and the like. Nevertheless, the number of instructions that can be uniquely identified with an opcode is generally more limited than often desirable. Generally, new instructions cannot continually be added to the opcode space of the processor without ultimately at some point running out of available opcodes.

Workloads change over time. Similarly, desired instructions and desired instruction functionalities change over time. New instruction functionalities are commonly added to processors on an ongoing basis. Similarly, some instructions/operations become relatively less useful and/or less frequently used and/or less important over time. In some cases, when instructions/operations have sufficiently limited usefulness or importance, they may be deprecated. Deprecation is a term commonly used in the arts to refer to a status applied to a component, feature, characteristic, or practice to indicate that it should generally be avoided often because it is in the process of being abandoned or superseded and/or may not be available or supported in the future.

Commonly, such instructions/operations may be deprecated instead of being immediately removed in order to help provide temporary backward compatibility (e.g., to allow existing or legacy code to continue to run). This may allow time for the code to be brought into compliance with the superseding instructions/operations and/or may allow time for the existing or legacy code to get phased out. Often, deprecating instructions/operations from an instruction set takes a long time, for example on the order of many years if not decades, to allow time to sufficiently eliminate old programs. Conventionally, the value of the opcode of the deprecated instruction/operation generally could not be recaptured and reused for a different instruction/operation until such a long period of time passed. Otherwise, if legacy software was run, instructions having the opcode value may cause the processor to perform the superseding operation, rather than the intended deprecated operation, which could cause an erroneous result.

In some embodiments, instruction emulation may be used to help provide different meanings for a given opcode of an instruction. In some embodiments, the given opcode of the instruction may be interpreted with different meanings. In some embodiments, multiple opcode definitions may be supported for the given opcode. For example, the given opcode may be interpreted with a meaning that a software program having the instruction intends. By way of example, in some embodiments, an older or legacy software program may indicate that instructions with the given opcode are to have an older, legacy, or deprecated meaning, and a newer software program may indicate that instructions with the given opcode are to have a newer meaning. In some embodiments, the older or deprecated meaning may be emulated, whereas the newer meaning may be decoded into control signals and executed on the processors pipeline directly. Advantageously, in some embodiments, this may help to allow earlier recapture and reuse of opcodes being deprecated while still providing backward compatibility that allows older programs to still run with a deprecated opcode while allowing the deprecated opcode to also be used for newer programs with a different meaning to help improve performance.

Figure 6:
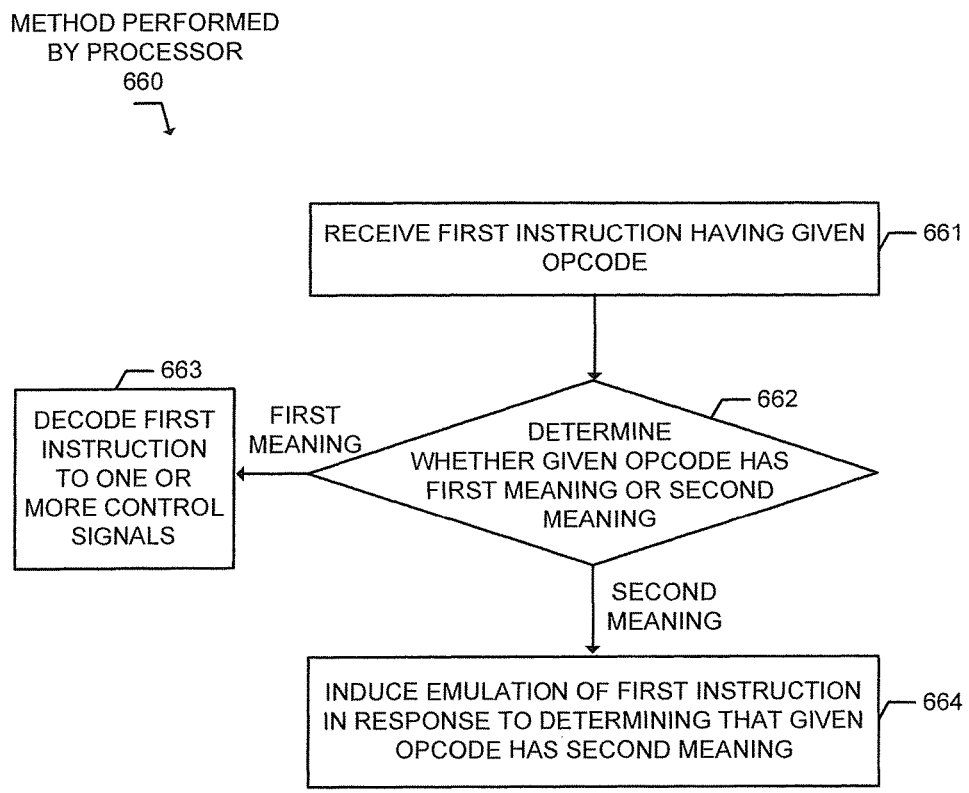
FIG. 6 is a block flow diagram of an embodiment of a method performed by and/or in a processor.

FIG. 6 is a block flow diagram of an embodiment of a method 660 performed by and/or in a processor. In some embodiments, the operations and/or method of FIG. 6 may be performed by and/or within the processor of FIG. 1 and/or the logic of FIG. 3 or FIG. 7. The components, features, and specific optional details described herein for the processor and logic also optionally apply to the operations and/or method of FIG. 6. Alternatively, the operations and/or method of FIG. 6 may be performed by and/or within a similar or entirely different processor or logic. Moreover, the processor of FIG. 1 and/or the logic of FIG. 3 or FIG. 7 may perform similar or different operations and/or methods than those of FIG. 6.

The method includes receiving a first instruction having a given opcode, at block 661. In some embodiments, the first instruction may be received at a decoder. A determination may be made, at block 662, whether the given opcode has a first meaning or a second meaning. In some embodiments, the first meaning may be a first opcode definition and the second meaning may be a second, different opcode definition. As will be explained further below, in some embodiments, this may involve the decoder reading or checking an indication, for example in a flag, status register, or other on-die storage location, of whether the given opcode has the first meaning or the second meaning. As will be explained further below, in some embodiments, software (e.g., a program loader module of an operating system module), may store the indication in the flag, status register, or other on-die storage location, when loading software to be run by the processor. By way of example, the software may include metadata (e.g., an object module format) to indicate whether the software expects or specifies the given opcode to have the first meaning or the second meaning.

Referring again to FIG. 6, if the determination at block 662 is that the given opcode has the first meaning, then the method may advance to block 663. At block 663, the first instruction may be decoded into one or more microinstructions, micro-operations, or other lower level instructions or control signals. In some embodiments, the decoder may output these instruction(s) or control signal(s) to post-decode instruction processor logic (e.g., execution units, etc.). The post-decode instruction processor logic may process these instructions, typically much faster than if emulation were instead used. In some embodiments, the first meaning may be used for non-deprecated opcode meanings, relatively newer opcode meanings, relatively more frequently used opcode meanings, opcode meanings that more strongly affect performance, or the like.

Conversely, if the determination at block 662 is that the given opcode has the second meaning, then the method may advance to block 664. At block 664, emulation of the first instruction may be induced. For example, the decoder may provide an emulation trap or otherwise signal an emulation mode to emulation logic. Subsequently, a set of one or more instructions of the emulation logic that are to be used to emulate the first instruction with the opcode having the second meaning may be provided to the decoder and processed in the emulation mode. This may be done substantially as described elsewhere herein. In some embodiments, the second meaning may be used for deprecated opcode meanings, opcode meanings in the process of being deprecated or about to be deprecated, relatively older opcode meanings, relatively less frequently used opcode meanings, opcode meanings that less strongly affect performance, or the like.

Figure 7:
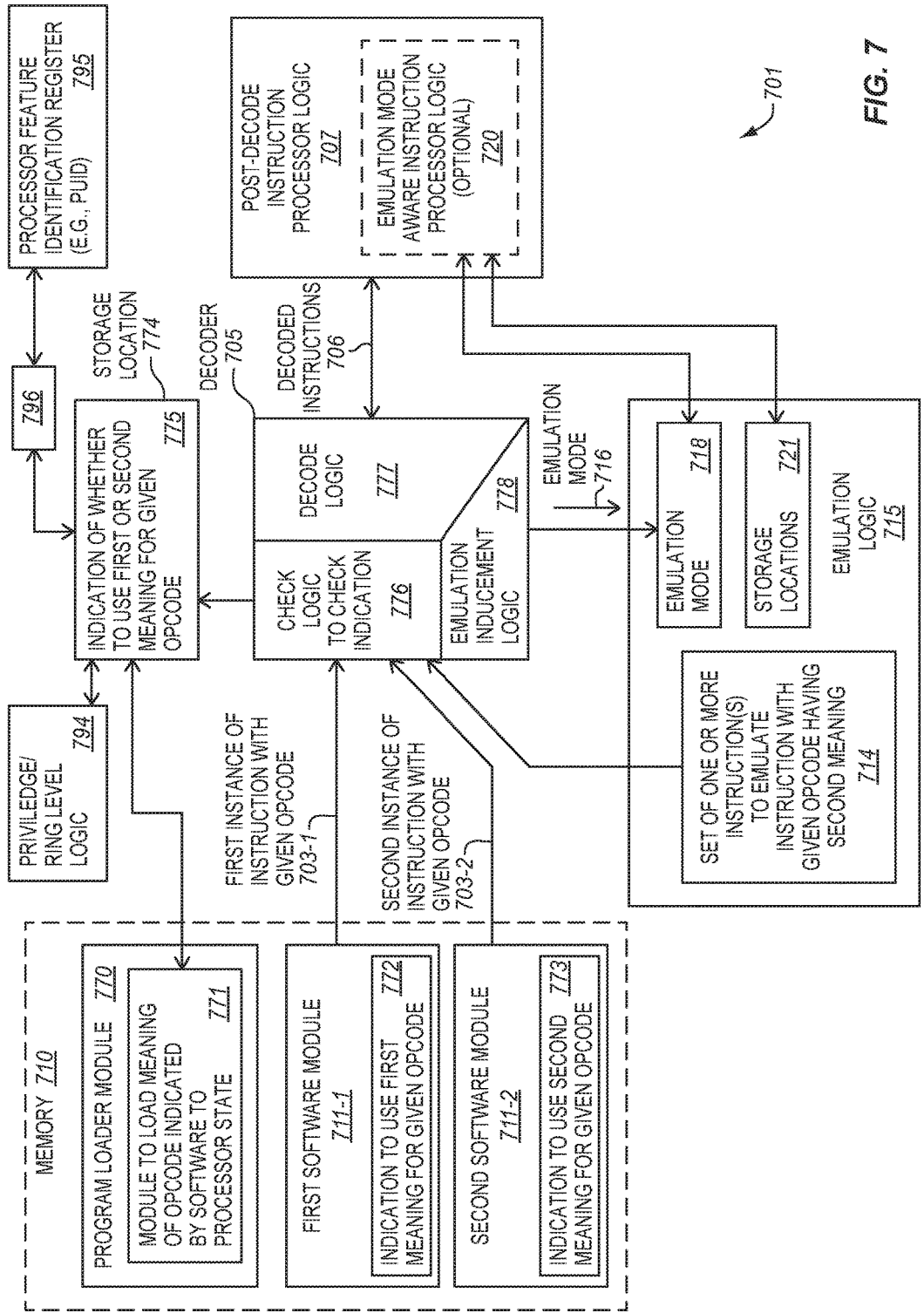
FIG. 7 is a block diagram illustrating an embodiment of logic to allow a given opcode to have different meanings.

FIG. 7 is a block diagram illustrating an embodiment of logic 701 to allow a given opcode to have different meanings. In some embodiments, the logic of FIG. 7 may be included in the processor and/or the computer system of FIG. 1 and/or the logic of FIG. 3. Alternatively, the logic of FIG. 7 may be included in a similar or different processor or computer system. Moreover, the processor and/or the computer system of FIG. 1 and/or the logic of FIG. 3 may include similar or different logic than that of FIG. 7.

A memory 710 includes a first software module 711-1, a second software module 711-2, and an operating system module 797 having a program loader module 770. In some embodiments, the first software module includes an indication 772 to use a first meaning for a given opcode, and the second software module includes an indication 773 to use a second different meaning for the given opcode. By way of example, the first and second software modules may each include an object module format, other metadata, or one or more data structures that include these indications 772, 773. The program loader module may be operable to load the first software module and the second software module for execution on a processor. As shown, in some embodiments, the program loader module may include a module 771 to load a meaning of the given opcode that is indicated by the particular software module onto the processor as processor state. In some embodiments, the module 771 may be operable to load the indication 772 when loading the first software module, or load the indication 773 when loading the second software module, to an on-die storage location 774 as an indication 775 of whether to use the first or second meaning for the given opcode. The on-die storage location is coupled with, or otherwise accessible to, a decoder 705.

In some embodiments, for example in the case of an old software module, the software module may not have an explicit indication to use a given meaning for the given opcode. For example, the software may be have written prior to the existence of the newer meaning. In some embodiments, the module 771 and/or the program loader 770 may be operable to infer whether the software module needs to use the first or second meaning of the given opcode. For example, this may be inferred from a feature list embedded in the program, the format of the program, the age of the program or the year the program was created, or other such information in the metadata and/or in the software module. For instance, if the second software module 711-2 is old software that was created prior to the introduction/definition of the first meaning of the given opcode, then the program loader module and/or the operating system module may be operable to infer that the second software module needs to use the second meaning not the first meaning for the given opcode. The module 771 may be operable to switch or swap out the indication 775 in the storage area when switching or swapping software.

To further illustrate, consider a first instance 703-1 of an instruction with the given opcode being provided to a decoder 705 from the first software module 711-1. The first software module includes the indication 772 to use the first meaning for the given opcode that the module 771 may preserve in the storage location 774. The decoder includes check logic 776 coupled with the storage location 774 to check the indication 775 of whether to use the first or second meaning for the given opcode. The check logic may access or read the storage location and determine that the first meaning is to be used for the given opcode when processing the first instance of the instruction from the first software module. In some embodiments, the storage location 774 may include multiple different storage locations to store multiple indications each corresponding to a different opcode. In response, decode logic 777 of the decoder may decode the instruction assuming the first meaning of the given opcode. One or more decoded instructions 706 or one or more other control signals may be provided from the decoder to post-decode instruction processing logic 707, which may process them.

A second instance 703-2 of an instruction with the same given opcode may be provided to the decoder 705 from the second software module 711-2. The second software module includes the indication 773 to use the second meaning for the given opcode that the module 771 may preserve in the storage location 774. The check logic 776 may check the indication 775 and determine that the second meaning is to be used for the given opcode when processing the second instance of the instruction from the second software module. In response, emulation inducement logic 778 may induce emulation of the second instance of the instruction 703-2. For example the emulation inducement logic may perform an emulation trap or otherwise signal an emulation mode 718. A set of one or more instructions 714 used to emulate the second instance of the instruction having the given opcode with the second meaning may be provided to the decoder from emulation logic 715. The emulation logic may be on-die, off-die, or partly on-die and partly off-die. The emulation logic 715 may have any of the optional characteristics described elsewhere herein for emulation logic.

In some embodiments, the instruction(s) 714 may be of the same instruction set as the instruction having the given opcode. In some embodiments, the decoder may decode each of these instructions and provide them as decoded instructions 706 or other control signals to the post-decode instruction processing logic. In some embodiments, the post-decode instruction processing logic may include emulation mode aware instruction processor logic 720, which may be similar to or the same as that described elsewhere herein (e.g., that of any of FIG. 1 or 3-5). As shown, in some embodiments, the emulation mode aware instruction processing logic may be coupled with, or otherwise aware of, the emulation mode 718. Moreover, the emulation mode aware instruction processing logic may be coupled with, and may read and write data in, storage locations 721 of the emulation logic.

In some embodiments, logic 796 may be included to update a processor feature identification register 795 based on the indication 775 in the storage location 774. An example of a suitable processor feature identification register is one used for CPU IDentification (CPUID). The logic 796 may be coupled with the storage location 774 and with the processor feature identification register 795. The processor feature identification register may be readable by a processor feature identification instruction (e.g., a CPUID instruction) of an instruction set of the processor. Software may read the indication of the meaning of the opcode from the processor feature identification register by executing the processor feature identification instruction.

In some embodiments, privilege level and/or ring level logic 794 may be coupled with the decoder 705 and may force or otherwise cause the decoder to use a given meaning of the opcode based on a privilege level and/or ring level. For example, this may be useful in embodiments where the first meaning is a newer meaning and the second meaning is a deprecated meaning. Operating systems typically operate at a particular privilege level and/or ring level that is different than that of user applications. Moreover, operating systems typically use the newer meaning of the given opcode not the older meaning of the given opcode, since they are generally updated frequently. In such cases, the privilege level and/or ring level logic 794 may cause the decoder to use the newer meaning of the given opcode when in a privilege or ring level corresponding to that of the operating system.

For simplicity of description, two different meanings of the opcode are typically described herein. However, it is to be appreciated that other embodiments may use three or more different meanings for a given opcode. By way of example, the storage location 774 may include two or more bits to indicate which of multiple such different meanings should be used for a given opcode. Likewise, the processor feature identification register may reflect multiple such meanings for the given opcode.

Figure 8:
FIG. 8 is a block flow diagram of an embodiment of a method that may be performed by an operating system module.

FIG. 8 is a block flow diagram of an embodiment of a method 880 that may be performed by an operating system module. In some embodiments, the method may be performed by a program loader module.

The method includes determining that a first instruction having a given opcode is to have a second meaning instead of a first meaning when executed by a processor from a software program, at block 881. This may be done in different ways in different embodiments. In some embodiments, the software program may explicitly specify an indication to use a given meaning for the given opcode. For example, the operating system module may examine metadata of the software program. For example, there may be a flag in an object module format that indicates which meaning to use. In other embodiments, for example in the case of legacy software, the software program may not explicitly specify the indication of which meaning to use. In some embodiments, the operating system module may include logic to infer which meaning to use. This may be done in various different ways. In some embodiments, this may include examining a feature list of the software program. In some cases, the feature list may specify which revision of instruction is expected. In some embodiments, this may include examining a creation date of the software program. A creating date older than a certain date, for example an instruction date of a newer superceding meaning, may be inferred as an indication that the software program uses the older or deprecated meaning. In some embodiments, this may include examining a format of the software program. For example, certain revisions program formats before certain level may be used to infer an older or deprecated meaning. In some embodiments, this may include examining an explicit list (e.g., an exception list) of software programs known to use certain meanings. By way of example, the list may be updated based on historical information (e.g., if an error results from one meaning, the other meaning may be added to the list). This is just one example. Other ways of inferring the meaning are also contemplated.

The method also includes storing an indication that the first instruction having the given opcode is to have the second meaning instead of a first meaning in state of the processor, at block 882. For example, the operating system module may modify a bit in a storage location coupled with a decoder, as described elsewhere herein.

Figure 9:
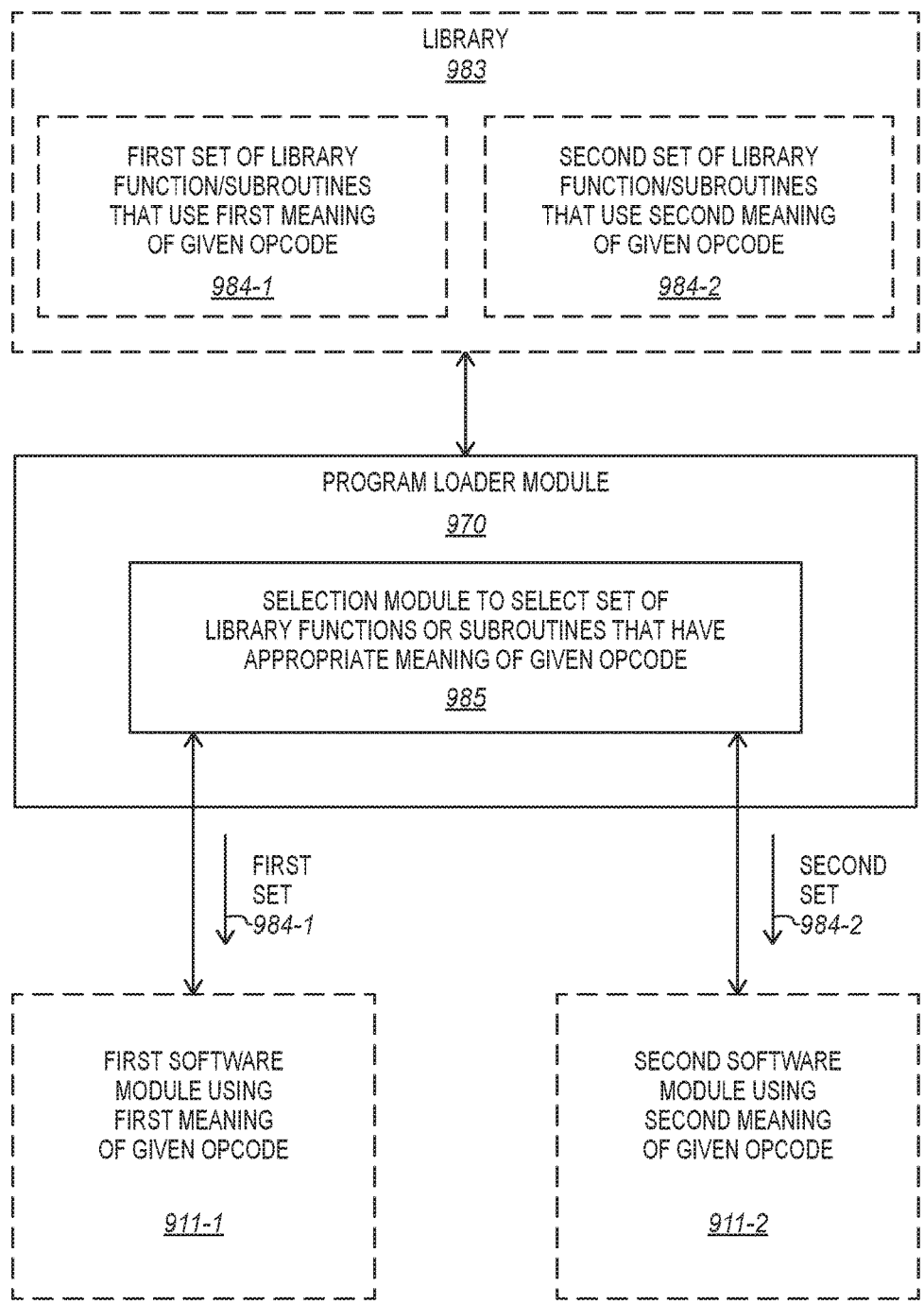
FIG. 9 is a block diagram of an embodiment of a program loader module including a selection module that is operable to select a set of one or more functions, subroutines, or other portions of a software library that have a meaning of a given opcode that is appropriate for software that will use them.

FIG. 9 is a block diagram of an embodiment of a program loader module 970 including a selection module 985 that is operable to select a set of one or more functions, subroutines, or other portions of a software library 983 that have a meaning of a given opcode that is appropriate for software that will use them. The software library generally represents a collection of software that various software modules may use and may include pre-existing software in the form of subroutines, functions, classes, procedures, scripts, configuration data, and the like. Software modules may use these various portions of the library to include various functionalities. As an example, a software module may incorporate a mathematics software library or portion thereof having various mathematical functions or subroutines.

As shown, in some embodiments, the library may include a first set of library functions, subroutines, or other portions that use a first meaning of a given opcode. The library may also include a second set of library functions, subroutines, or other portions that use a second different meaning of the given opcode. Optionally, if there are more than two meanings of the opcode, there may likewise be different portions of the library for each of the three or more different meanings. In some cases, the portions using the different meanings may be different pieces of code. In other cases, the portions may be different portions of the same code, and branches or other conditional movements may be used to move to either that portion which uses the first meaning or the second meaning as appropriate.

Referring again to the illustration, the program loader module 970 may load portions of the library for both a first software module 911-1 that uses a first meaning of the given opcode, and a second software module 911-2 that uses a second meaning of the given opcode. The program loader module includes a selection module 985 that is operable to select a set of one or more functions, subroutines, or other portions of the software library that have a meaning of the given opcode that is appropriate for the software that will use them. For example, the selection module may select portions of the library having the same meaning of the given opcode as the software that will use them. For example, as shown in the illustration, the selection module may select the first set 984-1 for the first software module 911-1 since it uses the first meaning of the given opcode. Likewise, the selection module may select the second set 984-2 for the second software module 911-2 since it uses the second meaning of the given opcode. In one particular embodiment, where the first software 911-1 is old software and the first meaning of the given opcode is a deprecated meaning, the selection module may be operable to select the first set of library portions 984 which also use that same the deprecated meaning for the given opcode. Accordingly, the selection module may select portions of a library that use a meaning of a given opcode that is consistent with or the same as the software that will use that portion of the library.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
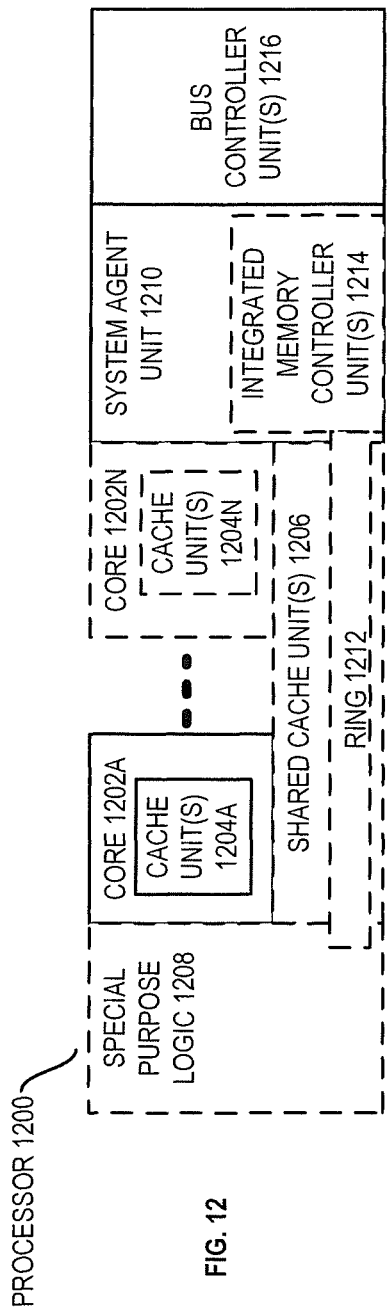
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
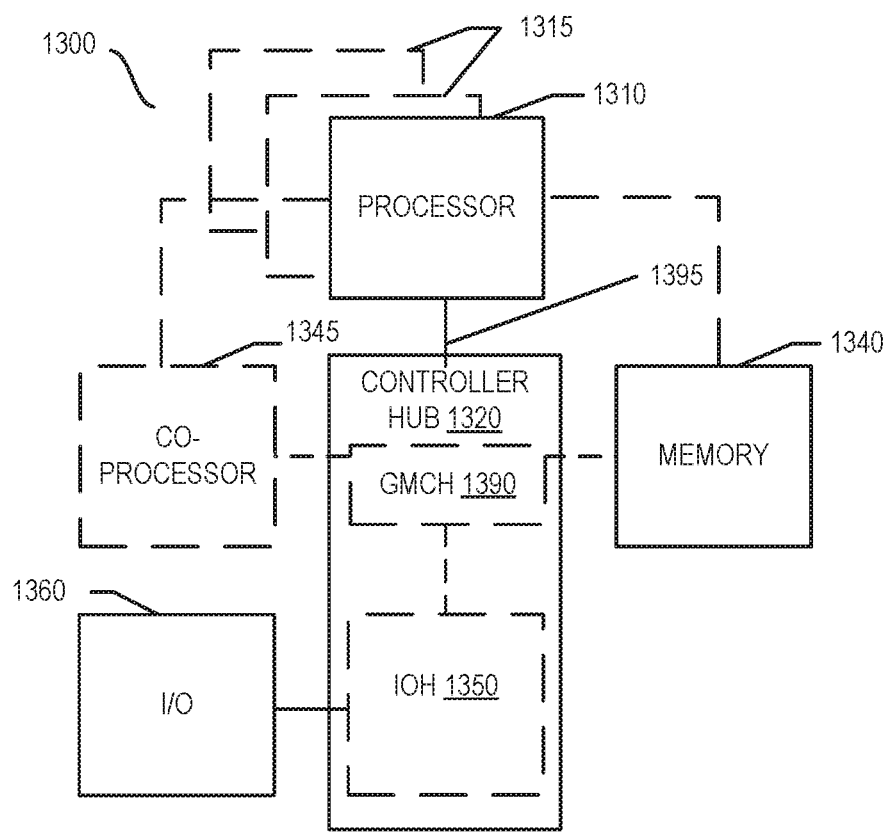
FIG. 13 shown is a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
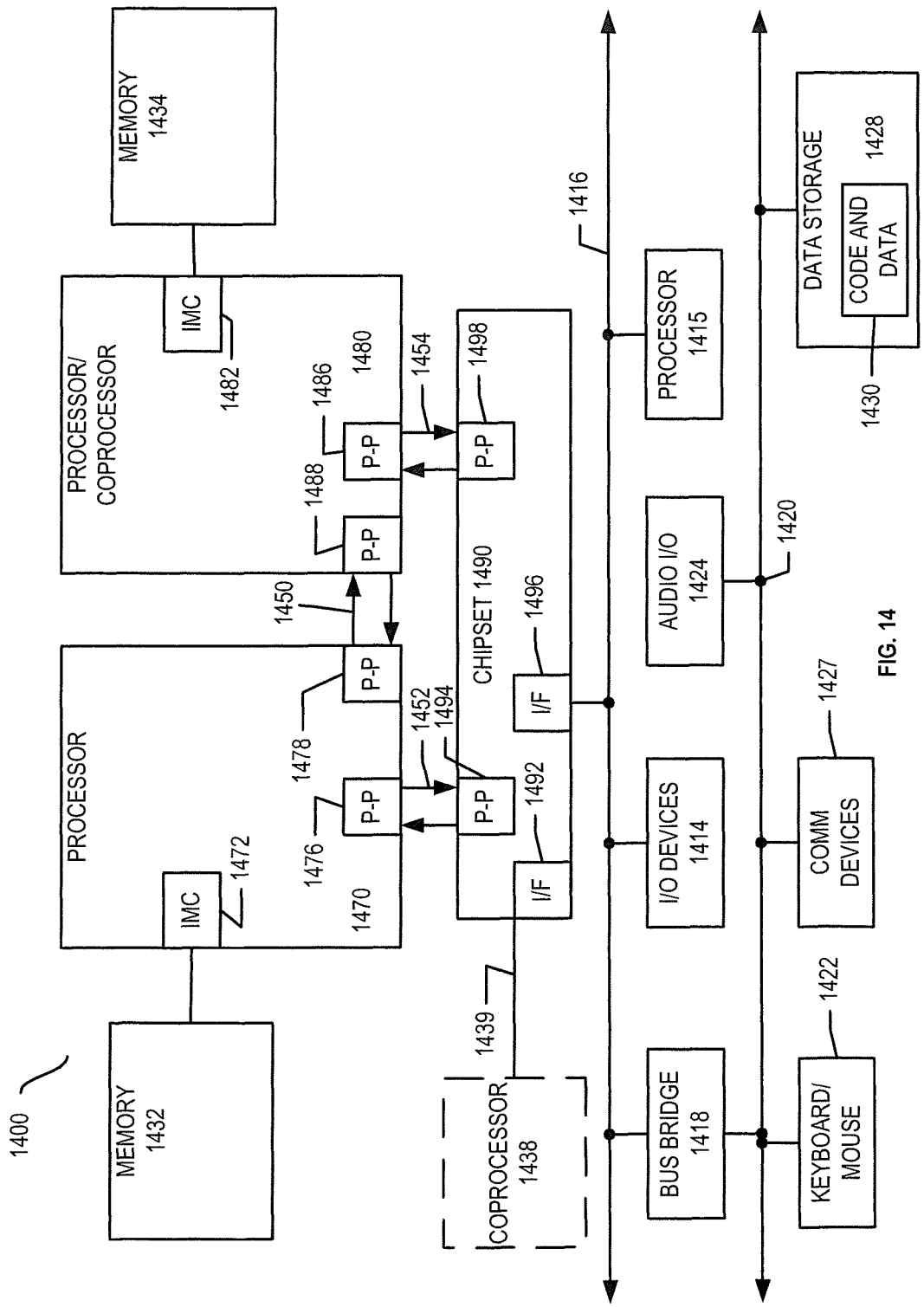
FIG. 14 shown is a block diagram of a first more specific exemplary system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
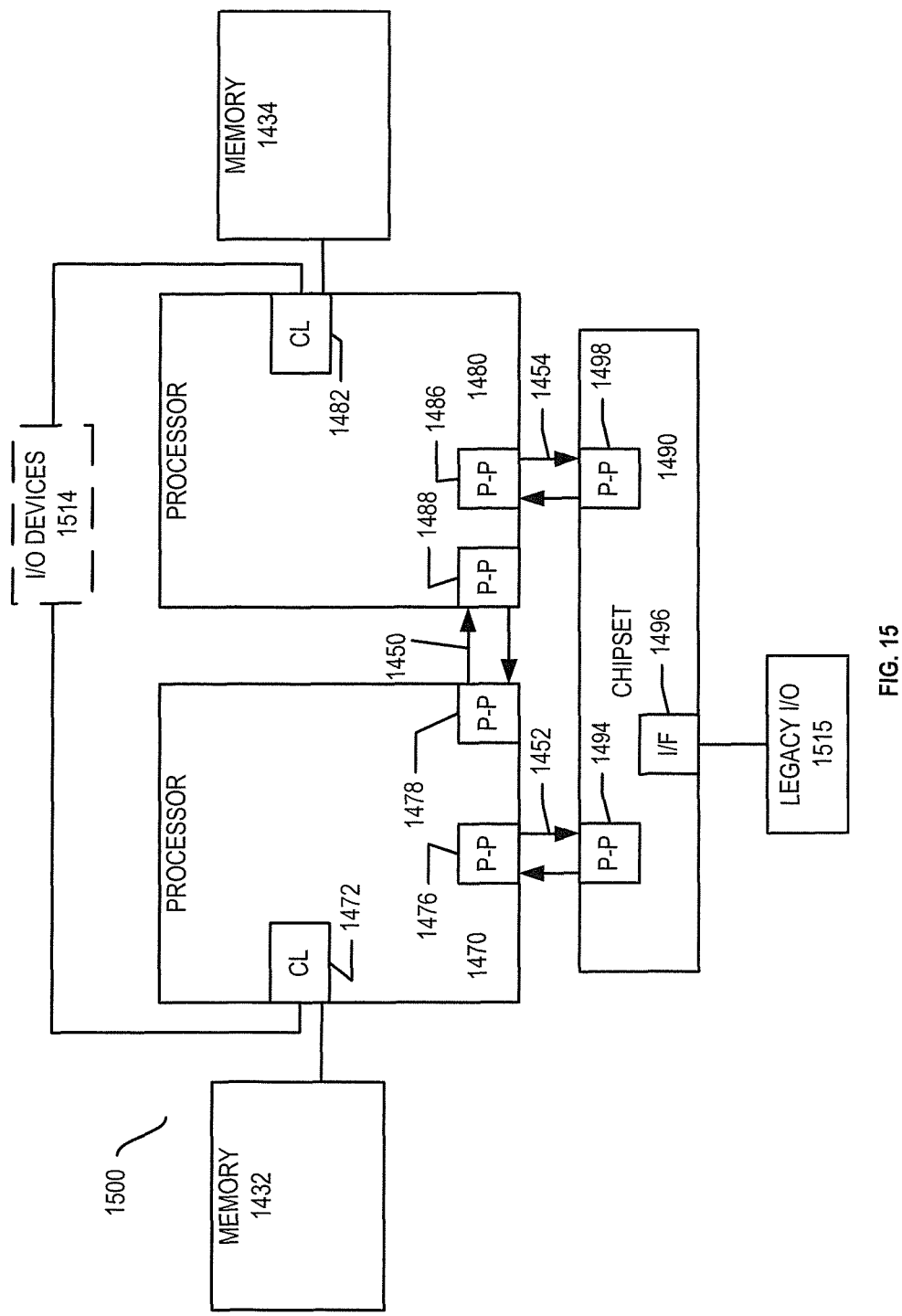
FIG. 15 shown is a block diagram of a second more specific exemplary system in accordance with an embodiment of the present invention.

Referring now to FIG. 15, shown is a block diagram of a second more specific exemplary system 1500 in accordance with an embodiment of the present invention Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
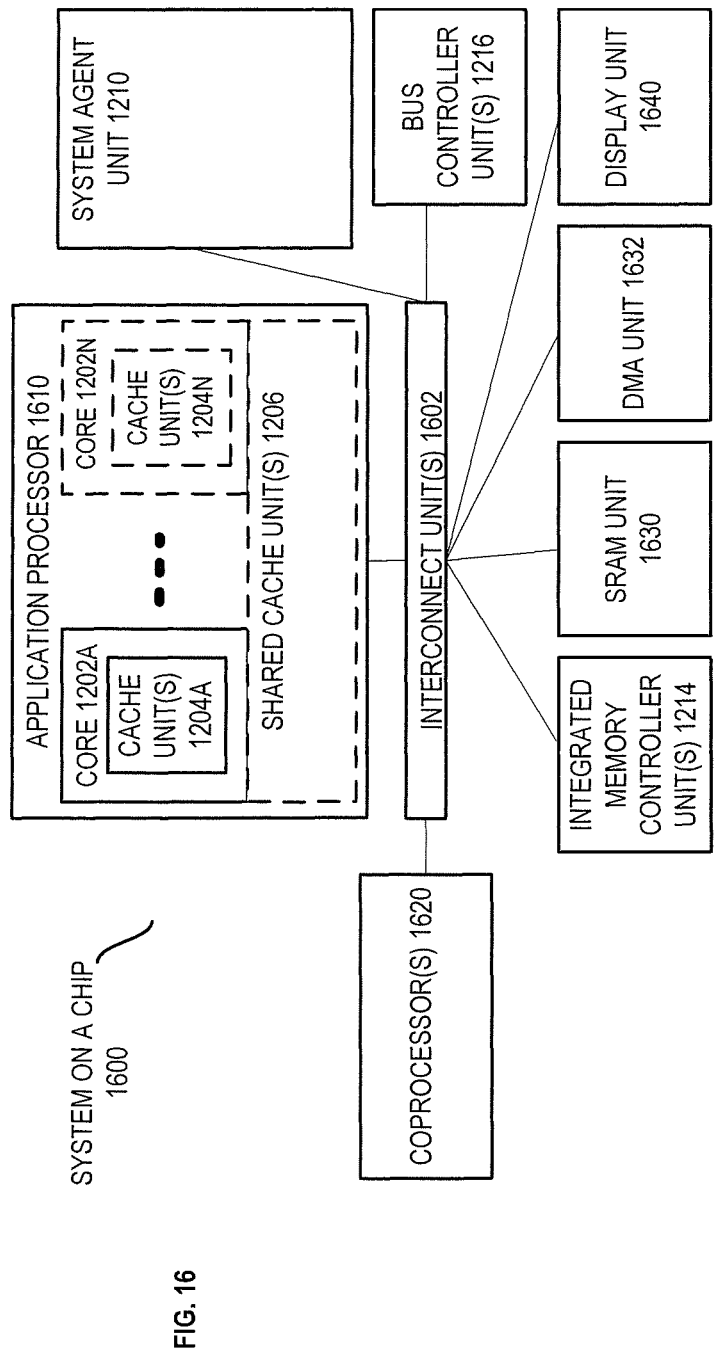
FIG. 16 shown is a block diagram of a SoC in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

In other embodiments, the library itself may include logic to select a set of library portions appropriate for a software module. For example, the library may read a processor feature status register to determine what meaning the software module has for the given opcode and then may select and provide that portion.

Components, features, and details described for any of FIGS. 1, 4, and 5 may also optionally be used in any of FIGS. 2 and 3. Moreover, components, features, and details described herein for any of the apparatus may also optionally be used in any of the methods described herein, which in embodiments may be performed by and/or with such the apparatus.

EXAMPLE EMBODIMENTS

The following examples pertain to further embodiments. Specifics in the examples may be used anywhere in one or more embodiments.

Example 1 is a processor that includes decode logic to receive a first instruction and to determine that the first instruction is to be emulated. The processor also includes emulation mode aware post-decode instruction processor logic coupled with the decode logic. The emulation mode aware post-decode instruction processor logic is to process one or more control signals decoded from an instruction, of a set of one or more instructions used to emulate the first instruction, differently when in an emulation mode than when not in the emulation mode.

Example 2 includes the processor of any preceding example and optionally wherein the first instruction is more complex than each instruction of the set in that the first instruction involves more operations being performed.

Example 3 includes the processor of any preceding example and optionally wherein the processor does not use microcode to implement any instructions of an instruction set.

Example 4 includes the processor of any preceding example and optionally wherein each instruction of the set of one or more instructions is of a same instruction set as the first instruction.

Example 5 includes the processor of any preceding example and optionally wherein the emulation mode aware post-decode instruction processor logic comprises emulation mode aware exceptional condition handler logic to report an exceptional condition that is to occur while processing the one or more control signals to emulation logic.

Example 6 includes the processor of any preceding example and optionally wherein the emulation mode aware exceptional condition handler logic is to store an address of the first instruction in a stack.

Example 7 includes the processor of any preceding example and optionally wherein the emulation mode aware exceptional condition handler logic is to store an indication of the exceptional condition, and an error code for the exceptional condition, in one or more registers coupled with the emulation logic.

Example 8 includes the processor of any preceding example and optionally wherein the emulation mode aware exceptional condition handler logic is to avoid directly transferring control to an exceptional condition handler in response to the exceptional condition, and wherein one or more instructions of the emulation logic is to transfer control to the exceptional condition handler.

Example 9 includes the processor of any preceding example and optionally wherein the emulation mode aware post-decode instruction processor logic comprises emulation mode aware access control logic to control access to at least one of a resource and information by the one or more control signals differently when in the emulation mode than when not in the emulation mode.

Example 10 includes the processor of any preceding example and optionally wherein the emulation mode aware access control logic is to allow access to said at least one of the resource and the information when in the emulation mode and prevent access to said at least one of the resource and the information when not in the emulation mode.

Example 11 includes the processor of any preceding example and optionally wherein the at least one of the resource and the information comprises at least one of security logic, secure information, encryption logic, decryption logic, random number generator logic, logic reserved for accesses by an operating system, a portion of memory reserved for accesses by an operating system, and information reserved for access by an operating system.

Example 12 includes the processor of any preceding example and optionally wherein the at least one of the resource and the information comprises at least one of a resource and information in one of another logical processor and another physical processor.

Example 13 includes the processor of any preceding example and optionally wherein the set of one or more instructions includes at least three instructions.

Example 14 is a method in a processor that includes receiving a first instruction, and determining to emulate the first instruction. The method also includes receiving a set of one or more instructions to be used to emulate the first instruction. The method also includes processing one or more control signals derived from an instruction of the set differently when in an emulation mode than when not in the emulation mode.

Example 15 includes the method of any preceding example and optionally wherein receiving the first instruction comprises receiving the first instruction that is more complex than each instruction of the set of one or more instructions.

Example 16 includes the method of any preceding example and optionally wherein receiving the set of the one or more instructions comprises receiving one or more instructions that are each of a same instruction set as the first instruction.

Example 17 includes the method of any preceding example and optionally wherein processing comprises reporting an exceptional condition that occurs while processing the one or more control signals to emulation logic. Also optionally executing one or more instructions of the emulation logic to transfer control to an exceptional condition handler.

Example 18 includes the method of any preceding example and optionally wherein reporting comprises storing an indication of the exceptional condition in one or more registers. Also optionally storing an address of the first instruction in a stack.

Example 19 includes the method of any preceding example and optionally wherein processing comprises controlling access to at least one of a resource and information by the one or more control signals differently when in the emulation mode than when not in the emulation mode.

Example 20 includes the method of any preceding example and optionally wherein controlling access differently comprises allowing access to said at least one of the resource and the information when in the emulation mode. Also optionally preventing access to said at least one of the resource and the information when not in the emulation mode.

Example 21 is a system to process instructions that includes an interconnect and a processor coupled with the interconnect. The processor includes decode logic to receive a first instruction and to determine that the first instruction is to be emulated. The processor also includes emulation mode aware post-decode instruction processor logic coupled with the decode logic. The emulation mode aware post-decode instruction processor logic is to process one or more control signals decoded from an instruction, of a set of one or more instructions used to emulate the first instruction, differently when in an emulation mode than when not in the emulation mode. The system also includes a dynamic random access memory (DRAM) coupled with the interconnect.

Example 22 includes the system of Example 21 and optionally wherein the emulation mode aware post-decode instruction processor logic comprises emulation mode aware exceptional condition handler logic to report an exceptional condition that is to occur while processing the one or more control signals to emulation logic.

Example 1 is a processor that includes a decoder to receive a first instruction having a given opcode. The decoder includes check logic to check whether the given opcode has a first meaning or a second meaning. The decoder also includes decode logic to decode the first instruction, and output one or more corresponding control signals, when the given opcode has the first meaning. The decoder also includes emulation inducement logic to induce emulation of the first instruction when the given opcode has the second meaning.

Example 2 includes the processor of any preceding example and optionally wherein the second meaning is older than the first meaning.

Example 3 includes the processor of any preceding example and optionally wherein the second meaning comprises an opcode definition that is in a process of becoming deprecated.

Example 4 includes the processor of any preceding example and optionally further comprising a storage location coupled with the decoder to store an indication of whether the given opcode has the first meaning or the second meaning, and wherein the check logic is to check the storage location to determine the indication.

Example 5 includes the processor of any preceding example and optionally wherein the storage location is accessible to a program loader module to allow the program loader module to store the indication in the storage location.

Example 6 includes the processor of any preceding example and optionally further comprising logic coupled with the storage location to store the indication from the storage location to a processor feature register, wherein the processor feature register is readable by a processor feature identification instruction of an instruction set of the first instruction.

Example 7 includes the processor of any preceding example and optionally further comprising a plurality of storage locations coupled with the decoder to store a plurality of indications, each of the indications to correspond to a different opcode of a plurality of opcodes, each of the indications to indicate whether each respective opcode has a first meaning or a second meaning.

Example 8 includes the processor of any preceding example and optionally wherein the logic to induce the emulation comprises logic to set an emulation mode.

Example 9 includes the processor of any preceding example and optionally further comprising emulation logic coupled with the decoder, the emulation logic, in response to the emulation inducement logic inducing the emulation, to provide a set of one or more instructions to the decoder to emulate the first instruction when the given opcode has the second meaning.

Example 10 includes the processor of any preceding example and optionally wherein each instruction of the set is of a same instruction set as the first instruction.

Example 11 includes the processor of any preceding example and optionally wherein the processor does not use microcode to implement any instructions of an instruction set.

Example 12 includes the processor of any preceding example and optionally further comprising logic to force the decoder to use a newer meaning instead of a deprecated meaning for the given opcode when one of a privilege level logic and a ring level logic indicates an operating system mode.

Example 13 is a method in a processor that includes receiving a first instruction having a given opcode and determining that the given opcode has a second meaning instead of a first meaning. The method also includes determining to emulate the first instruction in response to determining that the given opcode has the second meaning.

Example 14 includes the method of any preceding example and optionally wherein determining comprises determining that the given opcode has a second meaning that is older than the first meaning, and wherein the second meaning is in a process of being deprecated.

Example 15 includes the method of any preceding example and optionally wherein determining comprises reading an indication that the given opcode has the second meaning from a storage location.

Example 16 includes the method of any preceding example and optionally further comprising storing the indication that the given opcode has the second meaning in a processor feature register that is readable by a processor feature identification instruction of an instruction set of the processor.

Example 17 includes the method of any preceding example and optionally further comprising emulating the first instruction including decoding a set of one or more instructions that are used to emulate the first instruction when the given opcode has the second meaning.

Example 18 includes the method of any preceding example and optionally wherein decoding the set of instructions comprises decoding one or more instructions that are of a same instruction set as the first instruction.

Example 19 includes the method of any preceding example and optionally performed in the processor that does not use microcode to implement any instructions of an instruction set.

Example 20 is an article of manufacture that includes a non-transitory machine-readable storage medium that stores instructions that, if executed by a machine, will cause the machine to perform operations. The operations include determining that a first instruction having a given opcode is to have a second meaning instead of a first meaning when executed by a processor from a software module by examining metadata of the software module. The operations also include storing an indication that the first instruction having the given opcode is to have the second meaning in a state of the processor.

Example 21 includes the article of manufacture of any preceding example and optionally wherein the machine-readable storage medium further stores instructions that if executed by the machine will cause the machine to performing operations including selecting a portion of a software library that uses the second meaning of the given opcode instead of another portion of the software library that uses the first meaning of the given opcode, and providing the selected portion of the software library to the software module, wherein the second meaning is a deprecated meaning.

Example 22 includes the article of manufacture of any preceding example and optionally wherein the machine-readable storage medium further stores instructions that if executed by the machine will cause the machine to performing operations including determining that the given opcode has the second meaning based on an age of the software module.

Example 23 includes the article of manufacture of any preceding example and optionally wherein the machine-readable storage medium further stores instructions that if executed by the machine will cause the machine to performing operations including examining a flag in an object module format and storing the indication in a flag in a register of the processor.

Example 24 is a system to process instructions that includes an interconnect and a processor coupled with the interconnect. The processor is to receive a first instruction having a given opcode. The processor includes check logic to check whether the given opcode has a first meaning or a second meaning. The processor includes decode logic to decode the first instruction, and output one or more corresponding control signals, when the given opcode has the first meaning. The processor includes emulation inducement logic to induce emulation of the first instruction when the given opcode has the second meaning. The system also includes a dynamic random access memory (DRAM) coupled with the interconnect.

Example 25 includes the subject matter of Example 24 and optionally further comprising emulation logic to provide a set of one or more instructions of a same instruction set as the first instruction to the decoder to emulate the first instruction when the given opcode has the second meaning.

Example 26 includes apparatus to perform the method of any of Examples 13-19.

Example 27 includes apparatus comprising means for performing the method of any of Examples 13-19.

Example 28 includes apparatus to perform a method substantially as described herein.

Example 29 includes apparatus comprising means for performing a method as described herein.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a first component and a second component may be coupled with one another through an intervening component. In the figures, bidirectional arrows are used to show bidirectional connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. Where multiple components have been described, they may generally be incorporated into a single component. In other cases, where a single component has been described, it may generally be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more instructions, that if and/or when executed by a machine are operable to cause the machine to perform and/or result in the machine performing one or operations, methods, or techniques disclosed herein. Examples of suitable machines include, but are not limited to, processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
   a decode unit to receive a first instruction and to determine that the first instruction is to be emulated; and
   emulation mode aware post-decode instruction processor logic coupled with the decode unit, the emulation mode aware post-decode instruction processor logic to process one or more control signals that are to be decoded from an instruction, of a set of one or more instructions, which are to be used to emulate the first instruction, and which are of a same instruction set as the first instruction, differently when in an emulation mode than when not in the emulation mode,
   wherein the emulation mode aware post-decode instruction processor logic comprises emulation mode aware exceptional condition handler logic to report an exceptional condition, which is to occur while the one or more control signals are processed, to emulation logic, wherein the exceptional condition is one of an interrupt, a fault, a page fault, a memory protection fault, and a division by zero, and
   wherein the emulation mode aware exceptional condition handler logic is to avoid directly transferring control to an exceptional condition handler in response to the exceptional condition, and wherein one or more instructions of the emulation logic are to transfer control to the exceptional condition handler.

2. The processor of claim 1, wherein the emulation mode aware exceptional condition handler logic is to store an address of the first instruction in a stack following the occurrence of the exceptional condition.

3. The processor of claim 1, wherein the emulation mode aware exceptional condition handler logic is to store an indication of the exceptional condition, and an error code for the exceptional condition, in one or more registers coupled with the emulation logic.

4. A processor comprising:
   a decode unit to receive a first instruction and to determine that the first instruction is to be emulated; and
   emulation mode aware post-decode instruction processor logic coupled with the decode unit, the emulation mode aware post-decode instruction processor logic to process one or more control signals decoded from an instruction, of a set of one or more instructions, which are to be used to emulate the first instruction, and which are of a same instruction set as the first instruction, differently when in an emulation mode than when not in the emulation mode,
   wherein the emulation mode aware post-decode instruction processor logic comprises emulation mode aware access control logic to control access to at least one of a resource and information by the one or more control signals differently when in the emulation mode than when not in the emulation mode,
   wherein the emulation mode aware access control logic is to allow access to said at least one of the resource and the information when in the emulation mode and prevent access to said at least one of the resource and the information when not in the emulation mode, and
   wherein the at least one of the resource and the information comprises at least one of security logic, secure information, encryption logic, decryption logic, random number generator logic, logic reserved for accesses by an operating system, a portion of memory reserved for accesses by the operating system, and information reserved for access by the operating system.

5. The processor of claim 4, wherein the first instruction is more complex than each instruction of the set in that the first instruction involves more operations to be performed.

6. The processor of claim 5, wherein the processor does not use microcode to implement any instructions of an instruction set.

7. The processor of claim 4, wherein the at least one of the resource and the information comprises at least one of a resource and information in one of another logical processor and another physical processor.

8. The processor claim 4, wherein the set of the one or more instructions includes at least three instructions.

9. A method in a processor comprising:
   receiving a first instruction;
   determining to emulate the first instruction;
   receiving a set of one or more instructions to be used to emulate the first instruction, wherein each instruction of the set of the one or more instructions are of a same instruction set as the first instruction; and
   processing one or more control signals derived from an instruction of the set differently when in an emulation mode than when not in the emulation mode, wherein said processing comprises:
   reporting an exceptional condition that occurs while processing the one or more control signals to emulation logic; and
   executing one or more instructions of the emulation logic to transfer control to an exceptional condition handler.

10. The method of claim 9, wherein said receiving the first instruction comprises receiving the first instruction that is more complex than each instruction of the set of the one or more instructions.

11. The method of claim 9, wherein said reporting comprises:
- storing an indication of the exceptional condition in one or more registers; and
- storing an address of the first instruction in a stack.

12. The method of claim 9, wherein said processing comprises controlling access to at least one of a resource and information by the one or more control signals differently when in the emulation mode than when not in the emulation mode.

13. The method of claim 12, wherein said controlling access differently comprises:
- allowing access to said at least one of the resource and the information when in the emulation mode; and
- preventing access to said at least one of the resource and the information when not in the emulation mode.

14. A processor comprising:
- a decode unit to receive a first instruction and to determine that the first instruction is to be emulated; and
- emulation mode aware post-decode instruction processor logic coupled with the decode unit, the emulation mode aware post-decode instruction processor logic to process one or more control signals decoded from an instruction, of a set of one or more instructions, which are to be used to emulate the first instruction, and which are of a same instruction set as the first instruction, differently when in an emulation mode than when not in the emulation mode,
- wherein the emulation mode aware post-decode instruction processor logic is to allow access to at least one of a resource and information by the one or more control signals when in the emulation mode, but prevent access to said at least one of the resource and the information by the one or more control signals when not in the emulation mode, and
- wherein said at least one of the resource and the information comprises at least one of security logic, secure information, encryption logic, decryption logic, random number generator logic, logic reserved for accesses by an operating system, a portion of memory reserved for accesses by the operating system, and information reserved for access by the operating system.

15. A processor comprising:
- a decode unit to receive a first instruction and to determine that the first instruction is to be emulated; and
- emulation mode aware post-decode instruction processor logic coupled with the decode unit, the emulation mode aware post-decode instruction processor logic to process one or more control signals that are to be decoded from an instruction, of a set of one or more instructions, which are to be used to emulate the first instruction, and which are of a same instruction set as the first instruction, differently when in an emulation mode than when not in the emulation mode,
- wherein the emulation mode aware post-decode instruction processor logic is to handle an exceptional condition, which is to be one of an interrupt, a fault, a page fault, a memory protection fault, and a division by zero, differently while the one or more control signals are processed in the emulation mode than when the one or more control signals are processed not in the emulation mode.

* * * * *

UNITED STATES PATENT AND TRADEMARK OFFICE
CERTIFICATE OF CORRECTION

PATENT NO. : 9,703,562 B2  Page 1 of 1
APPLICATION NO. : 13/844881
DATED : July 11, 2017
INVENTOR(S) : William C. Rash et al.

It is certified that error appears in the above-identified patent and that said Letters Patent is hereby corrected as shown below:

In the Claims

In Column 36, Line 50, in Claim 8, after "processor" insert -- of --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*